(12) United States Patent
Cui

(10) Patent No.: US 11,373,117 B1
(45) Date of Patent: Jun. 28, 2022

(54) ARTIFICIAL INTELLIGENCE SERVICE FOR SCALABLE CLASSIFICATION USING FEATURES OF UNLABELED DATA AND CLASS DESCRIPTORS

(71) Applicant: Amazon Technologies, Inc., Seattle, WA (US)

(72) Inventor: Liying Cui, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1042 days.

(21) Appl. No.: 16/016,449

(22) Filed: Jun. 22, 2018

(51) Int. Cl.
*G06N 20/00* (2019.01)
*G06N 5/02* (2006.01)
*G06F 16/28* (2019.01)

(52) U.S. Cl.
CPC ........... *G06N 20/00* (2019.01); *G06F 16/285* (2019.01); *G06N 5/02* (2013.01)

(58) Field of Classification Search
CPC combination set(s) only.
See application file for complete search history.

(56) References Cited

U.S. PATENT DOCUMENTS

| | | | |
|---|---|---|---|
| 2016/0162975 A1* | 6/2016 | Chen | G06Q 30/0631 705/26.7 |
| 2019/0278600 A1* | 9/2019 | Frumkin | G06F 9/3885 |
| 2019/0325275 A1* | 10/2019 | Lee | G06K 9/66 |

OTHER PUBLICATIONS

Mahajan, Dhruv, Sundararajan Sellamanickam, and Vinod Nair. "Ajoint learning framework for attribute models and object descriptions." 2011 International Conference on Computer Vision. IEEE, 2011. (Year: 2011).*
LiYing Cui, et al., "Complex Networks: An Engineering View", IEEE Circuits and Systems Magazine, 2010, pp. 10-25.
LiYing Cui, et al., "Chapter 8 Internet Service Networks", Department of Industrial Engineering and Department of Physics, pp. 1-35.
LiYing Cui, et al., "Scenario Analysis of Web Service Composition based on Multi-Criteria Mathematical Goal Programming", Service Science, vol. 3, No. 4, 2011, pp. 280-303.
LiYing Cui, et al., "Large-scale Network Decomposition and Mathematical Programming based Web Service Composition", IEEE Computer Science, 2009 IEEE Conference on Commerce and Enterprise Computing, pp. 511-514.
AWS, "Amazon Machine Learning Developer Guide", Version Latest, Updated Aug. 2, 2016, pp. 1-139.

(Continued)

*Primary Examiner* — Kevin W Figueroa
(74) *Attorney, Agent, or Firm* — Robert C. Kowert; Kowert, Hood, Munyon, Rankin & Goetzel, P.C.

(57) ABSTRACT

At an artificial intelligence service, a first group of attributes of data items, which can be represented in the same encoding space as a second group of attributes of class descriptors, is identified. Feature data structures are generated that respectively represent (a) the first group of attributes of an unlabeled subset of the data items and (b) the second group of attributes of the class descriptors. In one or more training iterations, a class-weights data structure that meets a quality criterion is computed, where the computations of at least one iteration include generating an aggregate data structure from the feature data structures. The class-weights data structure is stored.

20 Claims, 12 Drawing Sheets

(56) References Cited

OTHER PUBLICATIONS

Liying Cui, "Mathematical Theory of Service Composition and Service Networks", A Dissertation in Industrial Engineering and Operations Research, 2011, pp. 1-190.

AWS, "Amazon SageMaker Developer Guide", Updated Nov. 29, 2017, pp. 1-345.

Liying Cui, et al., "Service Composition Using Dynamic Programming and Concept Service (CS) Network", Proceedings of the 2011 Industrial Engineering Research Conference, 2011, pp. 1-9.

* cited by examiner

ARTIFICIAL INTELLIGENCE SERVICE FOR SCALABLE CLASSIFICATION USING FEATURES OF UNLABELED DATA AND CLASS DESCRIPTORS

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds, web server logs, social media services, financial transaction records, security cameras, and the like.

Classification, or the task of identifying to which of a set of categories (sub-populations) a new observation belongs, on the basis of learning from a training set of data containing observations or examples whose category membership is known, is one of the most useful and often-used categories of machine learning techniques. A number of algorithms for classification of different levels of sophistication have been developed over the years, including, for example, linear classifiers such as logistic regression algorithms, Bayesian classifiers, support vector machines (SVMs), decision-tree based algorithms, neural network-based algorithms and the like.

In some classification problems, the set of classes to which individual data items are to be assigned (which may be referred to as "target" classes) may themselves be non-trivial to characterize: for example, items of a catalog may have to be classified according to a complex set of regulations, with some categories differing from others in small details. The target classes may be arranged in a non-trivial hierarchy, which may further complicate the classification problem. Some classification techniques which have proven to be successful, such as deep neural network based techniques, may require large numbers of labeled data items as positive and negative examples for the different classes; such large training data sets may be especially hard to acquire in scenarios in which there are thousands of target classes. Furthermore, many traditional classification techniques may potentially suffer from the problem of unrepresentative training data, where the models are too reliant on the characteristics of the labeled training data to be able to generalize well to make predictions for new data items whose characteristics may differ substantially from the input used for the training.

Figure 1:
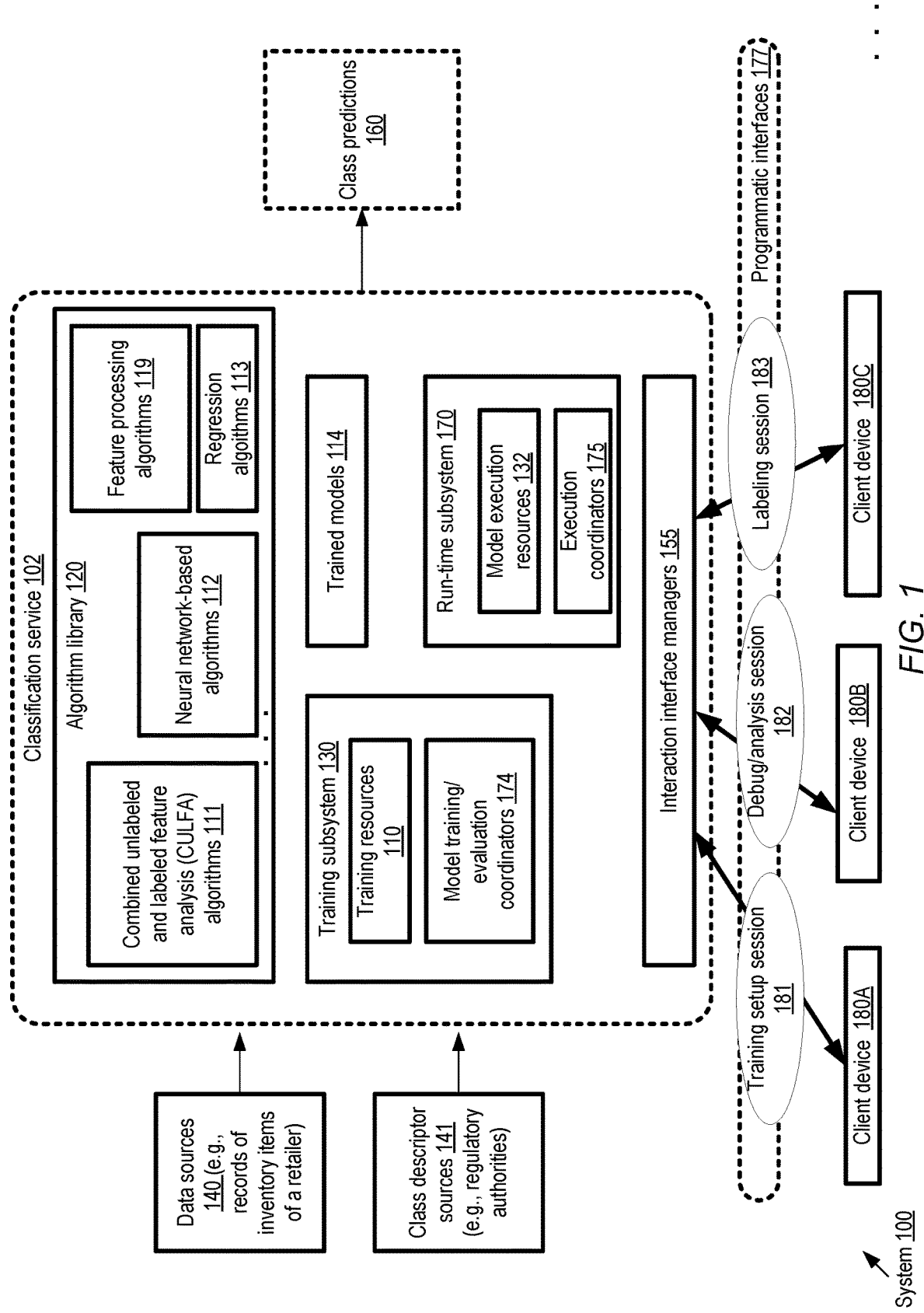
FIG. 1 illustrates an example system environment in which classification algorithms that use a combination of features of unlabeled and labeled data items to learn class weights may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for scalable classification of data items into a potentially large numbers of classes using a combination of unlabeled and labeled examples are described. In at least some embodiments, the data items may comprise complex multi-attribute records, and the target classes among which data items are to be distributed themselves may be represented by complex multi-attribute class descriptors; as such, features of both the entities that are to be classified, as well as the target classes, may be extracted and utilized to train a class prediction model in such embodiments. Subsets of the attributes of the class descriptors that have similar semantics or meanings and can be represented within a common or shared mathematical space (which may be referred to as an embedding space) as a subset of attributes of the data items may be identified in various embodiments. Such subsets may be referred to as "compatible" groups of attributes, in contrast to remaining attributes (which may not be representable meaningfully within a shared space), which may be referred to as "incompatible" attributes. Intuitively, both types of attributes may encode information that may be useful for classification purposes. For example, similarities between pairs of data items may be identifiable, at least in principle, based on incompatible attributes as well as compatible attributes; semantic relationships between data items and class descriptors (which can in turn lead to class predictions) may be identified using compatible attributes, and similarities between class descriptors may be identifiable using either compatible or incompatible attributes.

A prediction model that utilizes an iteratively learned class-weights matrix may be employed for classifying data items in at least some embodiments. The class-weights matrix may be referred to simply as a weights matrix in some embodiments. In one embodiment, one dimension of the class-weights matrix (e.g., the number of columns) may be based at least in part on the number of target classes, while another dimension may be based at least in part on the number of labeled examples used for learning the class-weights matrix. The class-weights matrix may be derived using computations involving aggregations of distinct feature matrices generated from compatible and incompatible subsets of attributes of labeled data items, unlabeled data items as well as class descriptors in some embodiments. Examples and formulations of the specific kinds of computations involved in the training of the prediction model are provided below. After the class-weights matrix is learned, in various embodiments it may be used to predict target classes for large numbers of new data items concurrently. In various embodiments, the kinds of computations used for generating the class-weights matrix may be amenable to parallelization—e.g., parallel matrix multiplication algorithms that can effectively utilize large clusters of computing platforms may be used, with intermediate results corresponding to subsets of the feature matrices being obtained at some nodes of the clusters and combined at other nodes.

As one skilled in the art will appreciate in light of this disclosure, certain embodiments may be capable of achieving various advantages, including some or all of the following: (a) reducing the overall resources (including for example CPU/GPU resources, memory resources, other storage resources, and the like) needed to train a classification model that meets targeted quality/accuracy criteria, even in scenarios in which the data sets may comprise millions of data items and the classification involves tens of thousands of complex target class descriptors, by utilizing features of unlabeled data to avoid over-fitting, and by using incompatible features of the class descriptors and the data items and/or (b) enhancing the user experience of data scientists and other entities/individuals involved in analyzing/debugging/understanding the classification workflow by providing, at each stage of the iterative training, indications of the relative impacts of various combinations of features being considered. Furthermore, in at least some embodiments, the inclusion of terms involving unlabeled data items in the computation of the class-weights matrix may lead to early detection of unrepresentative labeled data; addressing the problem of unrepresentative labeled data quicker (e.g., by obtaining additional labeled examples) may in turn help to avoid wasting training resources. The techniques described herein may help generalize the models without the negative side effects of some other generalization techniques in which some subsets of the training data may be dropped from the analysis (as in drop-out regularization), or in which the maximum dimensionality or order of features may be limited.

According to one embodiment, a system may comprise one or more computing devices of an artificial intelligence service. The computing devices may obtain a first set of data items, comprising a labeled subset and an unlabeled subset. The labeled subset may comprise one or more labeled data items, with respective labels of the labeled data items corresponding to respective class names or identifiers of a plurality of target classes for a given classification problem. The unlabeled subset may comprise one or more unlabeled data items. In addition to the data items themselves, the computing devices may obtain a set of class descriptors corresponding to the individual target classes in various embodiments. Individual ones of the data items and/or class descriptors may each comprise a plurality (e.g., potentially thousands) of attributes, including for example zero or more text attributes, image attributes, video attributes, audio attributes and the like. The number and/or data types of the attributes of the data items may differ from the number and/or data types of the attributes of the class descriptors in various embodiments. In at least one embodiment, the number of attributes for which values are available may differ from one data item to another, and/or from one class descriptor to another.

From among the attributes of the data items and the class descriptors, in various embodiments two broad types of attributes may be identified at the computing devices. One category of attributes of the data items, which may be referred to as "compatible" attributes, may be represented, using one or more feature processing algorithms, as respective points in a first multi-dimensional encoding space in some embodiments, such that one or more attributes of the class descriptors may also be represented (using some feature processing algorithm(s)) within the same encoding space. Remaining attributes of the data items and the class descriptors, which cannot be meaningfully represented in a shared or common vector space, may be referred to in such embodiments as "incompatible" attributes. Thus, attribute set AD of the data items may be split up into two subsets: $AD_{compat}$ (the compatible attributes which can be represented as points in a shared encoding space V1) and $AD_{incompat}$ (the incompatible attributes of the data items, which may be represented as points in an unshared encoding space V2). Similarly, attribute set AC of the class descriptors may also be split into two subsets: $AC_{compat}$ (the compatible attributes which can be represented as points in shared vector space V1) and $AC_{incompat}$ (the incompatible attributes of the class descriptors, which may be represented as points in another unshared vector space V3). Incompatible and/or compatible attribute subsets may each comprise various data types, including for example text, image, video or audio attributes in different embodiments.

Based on the subdivision of the attributes into compatible and incompatible subsets, as well as on the subdivision of the data items into labeled and unlabeled subsets, a number of feature matrices may be generated in various embodiments for use in the training of a classification model comprising a class-weights matrix. For example, in one embodiment, at least the following matrices may be generated at the computing devices: (a) a first feature matrix $C_L$ comprising representations, within a first multi-dimensional encoding space, of the compatible collection of attributes of at least some members of the labeled subset; (b) a second feature matrix $C_U$ comprising representations, within the first multi-dimensional encoding space, of the first collection of attributes of at least some members of the unlabeled subset; and (c) a third feature matrix S comprising representations, within the first multi-dimensional encoding space, of the compatible collection of attributes of at least some class descriptors.

In at least some embodiments, a set of iterative computations may then be initiated to determine elements of a class-weights matrix Q of the model which meets a classification accuracy criterion or a classification quality criterion. At least one dimension (e.g., the number of columns) of the class-weights matrix Q may be based at least in part on (e.g., may be equal to) the number of target classes in some embodiments. The other dimension of Q may be based at least in part on the number of items in the labeled subset in one embodiment. A given training iteration for Q may in various embodiments comprise computing (a) an aggregate matrix obtained $C_L$ and $C_U$ (such as a matrix product of $C_L$ and the transpose of $C_U$, or a matrix product of $C_U$ and the transpose of $C_L$) and (b) an aggregate matrix obtained from $C_U$ and S. The aggregate matrices may in effect represent semantic relationships between unlabeled data items and labeled data items, as well as semantic relationships between unlabeled data items and class descriptors. As such, unlike in many machine learning techniques in which only the features of labeled data items are used during training, the computations for determining Q may take into account information that was contained in unlabeled as well as labeled data items, thereby reducing the chances of overfitting. Other feature matrices, as well as versions of Q from prior iterations, may also be used in the iterative training in various embodiments, so that the knowledge gained in earlier iterations is propagated to later iterations, and so that other features (e.g., from incompatible feature subsets) are also included in the learning process. In various embodiments, during a given training iteration, elements of Q may be normalized (e.g., using a row-based normalization algorithm) and/or transformed using a label matrix L derived from the respective labels of the labeled subset of data items, as discussed below in further detail. After each iteration of training, in various embodiments respective labels may be predicted for a test set of data items via a row-maximum based algorithm using Q, and one or more metrics (e.g., accuracy, precision or the like) obtained from the test set predictions may be used to determine whether the model has reached a target quality threshold, or whether further iterations are required.

In at least some embodiments, after a training completion criterion is satisfied (e.g., after a desired quality of predictions has been attained, or after a budget of resources or time set aside for the training has been exhausted), the trained version of Q may be stored. The trained version of Q as well as one or more feature vectors extracted from data item(s) being classified may be used to generate class predictions as needed in various embodiments. Predictions may be generated concurrently for individual data items or for a batch of data items at a time in some embodiments. Indications of the class predictions may be provided to one or more destinations in some embodiments (e.g., via a programmatic interface to a submitter of a classification request).

As mentioned earlier, in some embodiments feature sets extracted from the incompatible attributes of the data items and/or the incompatible attributes of the class descriptors may also be used in the training iterations for Q. Just as feature matrices $C_L$, $C_U$ and S may be extracted from the compatible subset of attributes, feature matrices $D_L$ (representing incompatible attributes of labeled data items), $D_U$ (representing incompatible attributes of unlabeled data items) and E (representing incompatible attributes of class descriptors) may be generated and used in the matrix aggregation formulas for the training iterations in various embodiments, thereby incorporating some of the information represented in the incompatible attributes into the model.

In various embodiments, parallel computing resources may be used to speed up the computations, either during training or for generating predictions after training is complete. For example, in one embodiment, a plurality of computing nodes of a parallel computing service of a provider network or cloud computing environment may be used to perform at least a portion of a particular training iteration. Respective intermediate results of the training iteration (corresponding for example to sub-matrices of some of the feature matrices $C_L$, $C_U$, S, $D_U$, $D_L$, and/or R) may be produced at some of the computing nodes of a parallel computing service, and combined at other nodes in some embodiments.

In at least one embodiment, individual ones of the aggregate matrices produced during various stages of the training may be examined, and such intermediate results may be used to help guide future training-related actions such as obtaining more labeled data items. For example, in one embodiment, based at least in part on a computation of an impact of a particular aggregate matrix on a change to a class-weights matrix generated in a particular training iteration, a determination may be made that the labeled subset of the data items does not meet a coverage criterion. Operations to improve the coverage, e.g., by acquiring more labels from a set of label providers, may be initiated in some embodiments in response to such a determination.

It is noted that although, by way of example, matrices may be presented herein as the type of data structures or constructs that may be employed to store and compute information about features, class descriptors, class weights and the like, in at least some embodiments other data structures may be used with similar success to store similar types of data to help make class predictions. For example, a list of vectors may be used in some embodiments instead of a matrix, or a hash table-based data structure may be used. In various embodiments, the techniques described herein for scalable classification, using information extracted from a combination of labeled and unlabeled data items as well as from class descriptors, may not require the use of any particular types of mathematical constructs or data structures.

Example System Environment

FIG. 1 illustrates an example system environment in which classification algorithms that use a combination of features of unlabeled and labeled data items to learn class weights may be implemented, according to at least some embodiments. As shown, system 100 may comprise resources and artifacts of a classification service 102, including a training subsystem 130 and a run-time subsystem 170 in the depicted embodiment. Data items, to be used to train classifiers, and/or to be classified after training is completed, may be extracted from a variety of data sources 140, while class descriptors which indicate the target classes for various classification problems may be extracted from a different set of sources 141 in the depicted embodiment. For example, in one classification problem, records of inventory items of a large e-retailer may have to be classified according to a set of rules or laws issued by one or more regulators, such as rules/laws pertaining to import/export controls of various countries in which the inventory items may be purchased or sold. In this example, the class descriptors may constitute the class descriptors. Individual data items and/or individual class descriptors, may each comprise one or more attributes in some embodiments, such as text attributes (item descriptions, names, item source names, target customer segments, customer feedback entries etc.), numeric attributes (e.g., price, size, etc.), image attributes (still images of the items from various angles), video attributes (e.g., videos of the items), audio attributes (e.g., for some types of items such as music or books, audio extracts may be available as attributes), and so on. In at least one embodiment, for a given classification problem, data sources 140 and/or 141 may be static or dynamic—e.g., either all the data and class description information may be known beforehand, or some new data items or class details may be added over time.

In various embodiments, classification and/or other types of analysis of data items may be performed at classification service 102 with the help of any combination if a variety of algorithms of algorithm library 120. In some embodiments, classification models may be trained in response to programmatic requests received via one or more programmatic interfaces 155, such as web-based consoles, command-line tools, application programming interfaces (APIs), graphical user interfaces and the like. In one embodiment, clients or users of the classification service 102 may establish sessions of various types with the service via the interfaces 177 from client devices 180 (e.g., 180A, 180B or 180C) of their choice, such as laptops, tablet computing devices, desktops, smart phones and the like. In training setup sessions 181, for example, a client may indicate various objectives and inputs of the desired classifier, such as the specific data sources to be used, the class descriptor sources to be used, the quality objectives, resource budget limits and/or time limits for training, etc. In some embodiments, clients may indicate a preferred algorithm to be used for classification, as well as other details regarding the classification.

In response to a particular request to train a classifier, the service 102 may determine the particular algorithm to be employed, and initiate a set of training iterations in the depicted embodiment using training subsystem 130. Any of a wide variety of algorithms may be selected for a given classification problem from algorithm library 120, e.g., based on the types of the data items and the class descriptors, and/or based on the preferences of the client in various embodiments. For at least some types of problems, classification algorithms 111 that analyze combinations of features from unlabeled data as well as labeled data may be employed in the depicted embodiment; such algorithms may be referred to as combined unlabeled and labeled feature analysis (CULFA) algorithms in some embodiments. For other problems, neural network-based algorithms 112, and/or regression algorithms 113 may be used instead or in addition to the CULFA algorithms 111. In at least one embodiment, ensembles of multiple types of classification models may be employed for a given classification problem or training request. In various embodiments, algorithm library 120 may comprise a variety of feature processing algorithms 119, such as algorithms that generate multidimensional vector representations of one or more attributes of the data items and/or class descriptors, and such feature processing algorithms may be used by various classification algorithms. Feature processing algorithms 119 may for example, include word embedding algorithms, character-level embedding algorithms, TFIDF (term frequency-inverse document frequency) based algorithms, hierarchy encoding algorithms, neural network-based feature generation algorithms for non-text attributes (e.g., algorithms in which feature vectors for an image are extracted from internal layers of a convolution neural network), etc. in various embodiments. In some embodiments, clients may indicate the particular types of feature processing algorithms to be used for a given classification model, and/or meta-parameters such as the dimensionality of vectors to be used to encode features of subsets of attributes of data items and/or class descriptors.

In at least some embodiments, model training/evaluation coordinators 174 may be responsible for utilizing training resources 110 to perform training iterations of the selected classification algorithms. The coordinators 174 may be implemented at one or more computing devices in the depicted embodiment, and the training resources 110 may include various types of platforms such as individual servers, clusters of servers that can be used for parallel computing, etc. In at least some embodiments, the training of a particular classifier may be started using an initial set of labeled data items (with individual labels corresponding to class names of target classes), and more labels may be acquired as and when needed, e.g., using labeling sessions 183 with client devices 180C of a set of label providers. For example, as discussed below, in some embodiments in which the CULFA algorithms are used, intermediate results obtained during a training iteration may indicate that additional labels may be needed, and labeling sessions 183 may be established in response to such indications. Unlike some other classification algorithms such as neural network-based algorithms 112 which tend to be somewhat opaque regarding their internal computations, the CULFA algorithms 111 may expose the computations performed at each training iteration, as well as the relative contributions of individual terms towards a class-weights matrix being learned, which may enable data scientists and/or other interested parties to gain insights into the in-progress training in various embodiments. Debug/analysis sessions 182 may be set up from client devices 180B in some embodiments to help users such as data scientists to examine the intermediate results obtained in the training iterations. In various embodiments, interaction interface managers 155, implemented at one or more computing devices, may be responsible for receiving requests and/or labels from client devices 180, propagating internal versions of the requests to other components of the classification service, receiving responses from the internal components to the requests, and transmitting the responses to the client devices.

After a training completion criterion has been met for a given classifier, a trained version of the model(s) 114 may be stored in various embodiments. In the depicted embodiment, one or more model execution coordinators 175 of run-time subsystem 170 may respond to classification requests for data items by executing the trained models 114 at resources 132. The class predictions 160 generated for the data items may be provided to one or more destinations, e.g., to the requesters or to some downstream analysis system or service.

In various embodiments in which a CULFA algorithm 111 is selected for a particular classification problem for a set of data items, labeled and unlabeled subsets of the data items set may be identified. The group of class descriptors representing the target classes. As mentioned earlier, the data items and the class descriptors may each comprise one or more attributes of various data types, such as text, image, etc. A collection of one or more attributes $AD_{compat}$ of the data items that are representationally/semantically compatible with a collection of one or more attributes $AC_{compat}$ of the class descriptors may be identified—e.g., such that the attributes of $AD_{compat}$ and $AC_{compat}$ can both be represented meaningfully within the same multi-dimensional vector space using one or more feature processing algorithms 119. The collections of remaining attributes of data items and class descriptors, which cannot be meaningfully represented in a shared space, may be referred to as incompatible attributes n $AD_{incompat}$ (the data item attributes) and $AC_{incompat}$ (the class descriptor attributes).

Consider a highly simplified example in which each data item has a name attribute N (of data type "text"), a description attribute D (also of type "text"), an image attribute I, a price attribute P (of type "real number"), and a video attribute V, while a class descriptor (corresponding to a rule hierarchy used for item classification for import/export) has a rule description attribute RD (of type "text") and a hierarchical rule identifier HRI expressed as a sequence of roman numeral followed by a period followed by a capital letter followed by another period and an integer (e.g., "V.A.36"). In such a scenario, the text attributes (N, D and RD) may be mapped into a common embedding vector space, and so may be part of the compatible subsets, while the image, video, price and rule identifier attributes (I, V, P and HRI) may be considered incompatible. Thus, in this example $AD_{compat}=\{N, D\}$, $AC_{compat}=\{RD\}$ $AD_{incompat}=\{I, P, V\}$ and $AD_{incompat}$ {HRI}. Note that not all the attributes that can be meaningfully represented in a shared data space may be of the same data type in at least some embodiments—e.g., if, in the above example, the class descriptors for the rules also had respective image attributes RI, then I and RI may also have been included in the compatible collection of attributes. In some embodiments, a client of classification service 102 may programmatically indicate which attribute combinations of the data items and class descriptors are compatible, and the particular feature processing algorithms which can be used to generate the compatible feature sets from the raw attribute values. In other embodiments, syntactic and/or semantic analysis may be performed at the training subsystem 130 to determine the compatible and incompatible attributes.

After the compatible and incompatible attributes have been identified, in various embodiments a group of feature matrices (or other data structures in which feature sets of attribute collections can be represented) may be generated in various embodiments using selected feature processing algorithms 119. Such feature matrices may, for example, include $C_L$ (representing compatible attributes of labeled data items), $C_U$ (representing compatible attributes of unlabeled data items), S (representing compatible attributes of class descriptors), $D_L$ (representing incompatible attributes of labeled data items), $D_U$ (representing incompatible attributes of unlabeled data items), and/or E (representing incompatible attributes of class descriptors). Individual rows of such feature matrices may comprise respective feature vectors in various embodiments—e.g., one row of $C_L$ may correspond to a feature vector generated from one labeled data item's compatible attributes. One or more training iterations may then be performed to determine elements of a class-weights matrix (or data structure) Q using some or all of the feature matrices. For example, aggregate data structures may be obtained in some embodiments during a given training iteration using $C_L$ and $C_U$ (thereby combining information from compatible attributes of labeled and unlabeled data items), $C_U$ and S (thereby combining information from unlabeled data items and class descriptors), and so on. A matrix L comprising the labels of the labeled data items, as well as one or more normalization operations on Q may also be used during at least some training iterations. Details of various computations used to learn Q iteratively, and the manner in which Q may be used to predict classes for data items, are provided below. In various iterations, predictions generated using Q, e.g., on a hold-out test set of data items, may be used to determine whether the CULFA classification model has attained a targeted quality level in some embodiments; training may be terminated when a quality objective is met and/or when a set of resources designated for training are exhausted. The trained version of Q may be stored, representing at least a part of a trained model 114, and used to generate class predictions 160 for new data items as desired in various embodiments. As discussed below in further detail, in at least some embodiments, features extracted from the new data items may also be used along with Q to generate the predictions 160.

Compatible and Incompatible Attributes

Figure 2:
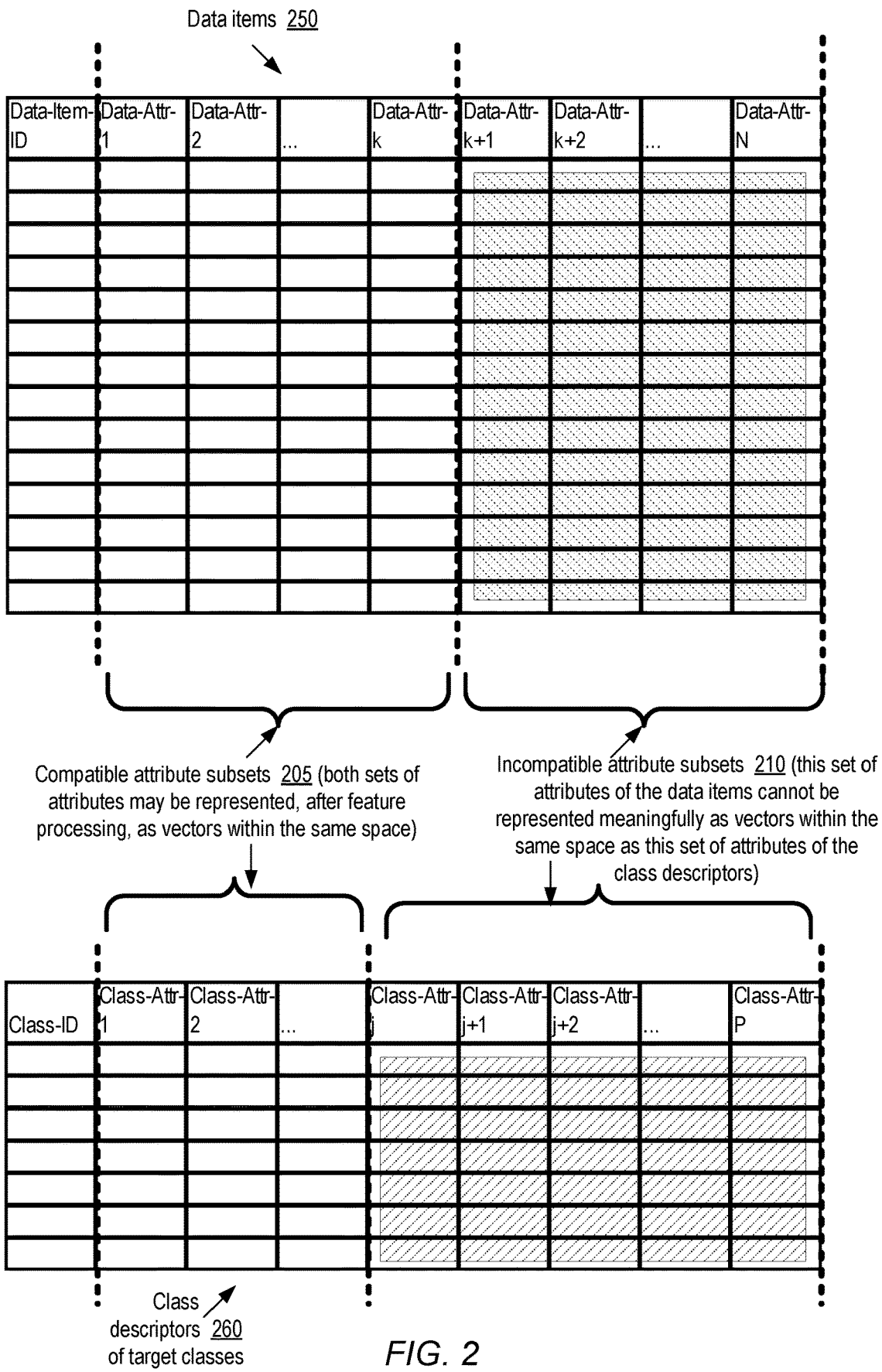
FIG. 2 illustrates an example scenario in which the attributes of data items and class descriptors may be subdivided into compatible and incompatible categories, according to at least some embodiments.

FIG. 2 illustrates an example scenario in which the attributes of data items and class descriptors may be subdivided into compatible and incompatible categories, according to at least some embodiments. In the depicted embodiment, individual ones of the data items 250, identified by an attribute called Data-item-ID, may comprise respective values for N attributes Data-Attr-1, Data-Addr2, Data-Addr-N. Individual ones of class descriptors, identified by a Class-ID attribute, may comprise values for P attributes, Class-Attr1, Class-Attr2, Class-Attr-P.

A representationally compatible or semantically compatible collection of attributes 205 may be identified from the attributes of the data items and the class descriptors. For example, the attributes Data-Attr-1 through Data-Attr-k may be identified as being representable, after some set of feature processing or feature engineering transformations, into a 2048-element vector, and the same type of vector may be used to represent (after similar feature transformation) attributes Class-Attr-1 through Class-Attr-j–1. As a result, these collections of attributes may be designated as being compatible with one another. The remaining attributes (e.g., Data-Attr-k+1 through Data-Attr-n of the data items, and Class-Attr-j through Class-Attr-p of the class descriptors) may be designated as incompatible attributes 210 in the depicted embodiment. Note that the set of compatible (or incompatible) attributes may not necessarily be contiguous within a data item or a class descriptor in at least some embodiments. Note also that while in general it may be possible to transform any data into a vector using a feature processing algorithm, the two sets of data being transformed into a vector may be required to be semantically similar (e.g., to represent similar concepts, such as item descriptions on the data item side and class descriptions on the class descriptor side) to be considered compatible in various embodiments. As mentioned earlier, in at least some embodiments the compatible attributes 205 may be indicated by clients of a classification service or classification tool being used, e.g., in a programmatic interaction. In other embodiments, an automated analysis of attribute names, data types and the like may be performed at the classification service or tool to identify the compatible attributes.

Feature Extraction Examples

Figure 3:
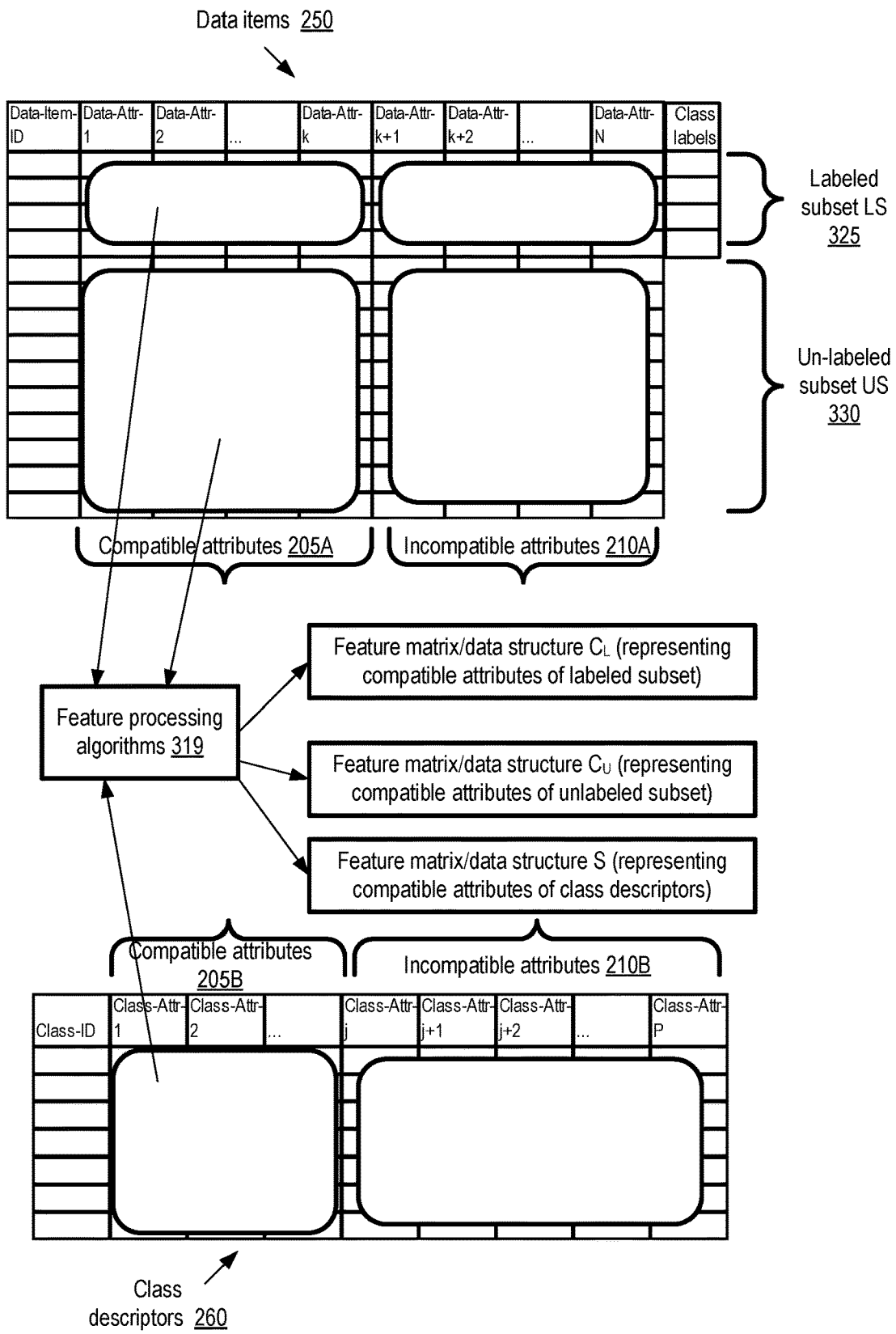
FIG. 3 illustrates an example scenario in which feature processing algorithms may be used to generate a first group of feature data structures for compatible subsets of attributes of data items and class descriptors, according to at least some embodiments.

FIG. 3 illustrates an example scenario in which feature processing algorithms may be used to generate a first group of feature data structures for compatible subsets of attributes of data items and class descriptors, according to at least some embodiments. In the depicted embodiment, the collection of compatible attributes (205A in the case of data items 250, and 25B in the case of class descriptors 260), have already been identified. In addition, the data items 250 have also been divided into a labeled subset LS 325 and an unlabeled subset US 330. Because of the division of the data items 250 along these two axes, it is possible to identify four collections of attributes of the data items: (labeled and compatible), (labeled and incompatible), (unlabeled and compatible), and (unlabeled and incompatible).

Using some set of one or more feature processing algorithms 319, at least three matrices (or other data structures) comprising information extracted from the compatible attributes may be constructed in the depicted embodiment. Feature matrix/data structure $C_L$ may represent compatible attributes of the labeled subset LS of data items, feature matrix/data structure $C_U$ may represent compatible attributes of the un-labeled subset US of data items, and feature matrix/data structure S may represent compatible attributes of the class descriptors 260, for example. In a simplified example in which, for example, there are 1000 labeled data items, 999000 unlabeled data items, 100 class descriptors, matrices are used as the data structures, and the feature processing algorithms generate a 4096-element vector as output for an input collection of attributes, the dimensions of 0, would be (1000×4096), the dimensions of $C_U$ would be (999000×4096), and the dimensions of S would be (100× 4096). As such, a given row of each matrix in this example would comprise the 4096-element feature vector generated from the compatible collection of attributes of a data item or class descriptor.

Figure 4:
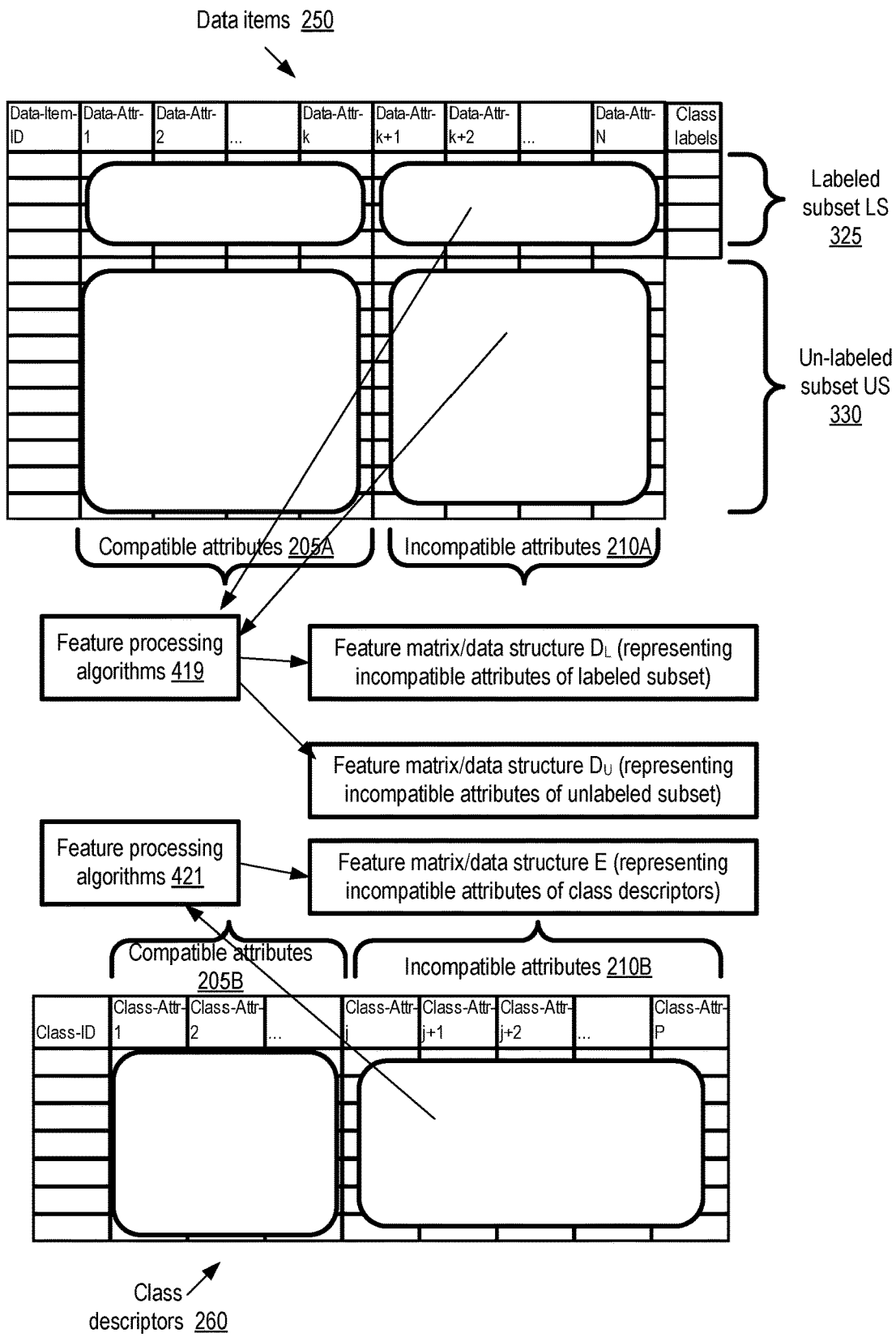
FIG. 4 illustrates an example scenario in which feature processing algorithms may be used to generate another group of feature data structures for incompatible subsets of attributes of data items and class descriptors, according to at least some embodiments.

FIG. 4 illustrates an example scenario in which feature processing algorithms may be used to generate another group of feature data structures for incompatible subsets of attributes of data items and class descriptors, according to at least some embodiments. As in the scenario depicted in FIG. 3, the data items 250 have been subdivided into four collections of attributes: (labeled and compatible), (labeled and incompatible), (unlabeled and compatible), and (unlabeled and incompatible).

Using some set of feature processing algorithms 419, feature matrices/data structures $D_L$ and $D_U$ may be constructed from the incompatible attributes in the depicted embodiment. Feature matrix/data structure M, may represent incompatible attributes of the labeled subset LS of data items, while feature matrix/data structure $D_U$ may represent incompatible attributes of the un-labeled subset US of data items. Using another set of feature processing algorithms 421, feature matrix E may also be generated to represent the incompatible attributes of the class descriptors in the depicted embodiment. Note that different sets of feature processing algorithms 419 and 421 may be used in some embodiments because, for example, different data types may be included in the incompatible attributes of the data items than are included in the data types of the incompatible attributes of the class descriptors.

The simplified example discussed in the context of FIG. 3 may be extended as follows to include the incompatible attributes. As before, assume there are 1000 labeled data items, 999000 unlabeled data items, 100 class descriptors, and matrices are used as the data structures. Assume further that the feature processing algorithms 419 generate an 8192-element vector as output for an input collection of attributes, and that the feature processing attributes 421 generate a 2048-element vector. The dimensions of $D_L$ would then be (1000×8192), the dimensions of $D_U$ would be (999000×8192), and the dimensions of E would be (100× 2048) in the example scenario.

In general, each of the feature matrices/data structures (taken together with the available labels of subset LS of the data items) may comprise encodings of at least some information that may be useful for classifying the unlabeled data items. However, depending on the particular classification problem being addressed, in at least some embodiments one or more of the feature matrices/data structures may not necessarily be generated and used for training the classification model(s). For example, E may not be generated or used in some embodiments. The decision as to whether any of the feature matrices or data structures discussed is to be used for the classification model may be made, for example, based on various factors such as the sizes of the sets LS and US, the number of attributes involved, the complexity of feature processing, and so on. Furthermore, in at least some embodiments, not all the attributes may have to be represented within a feature matrix/data structure—e.g., if there are 500 incompatible attributes in a given data item, only 400 may be used to construct $D_L$ and $D_U$ in one embodiment. In some embodiments, respective coefficients may be assigned as discussed below to individual aggregate data structures being added to generate the class-weights matrix; such coefficients may indicate the relative importance being assigned to the different terms for a given classification problem.

Example Class Weights Computations

Figure 5:
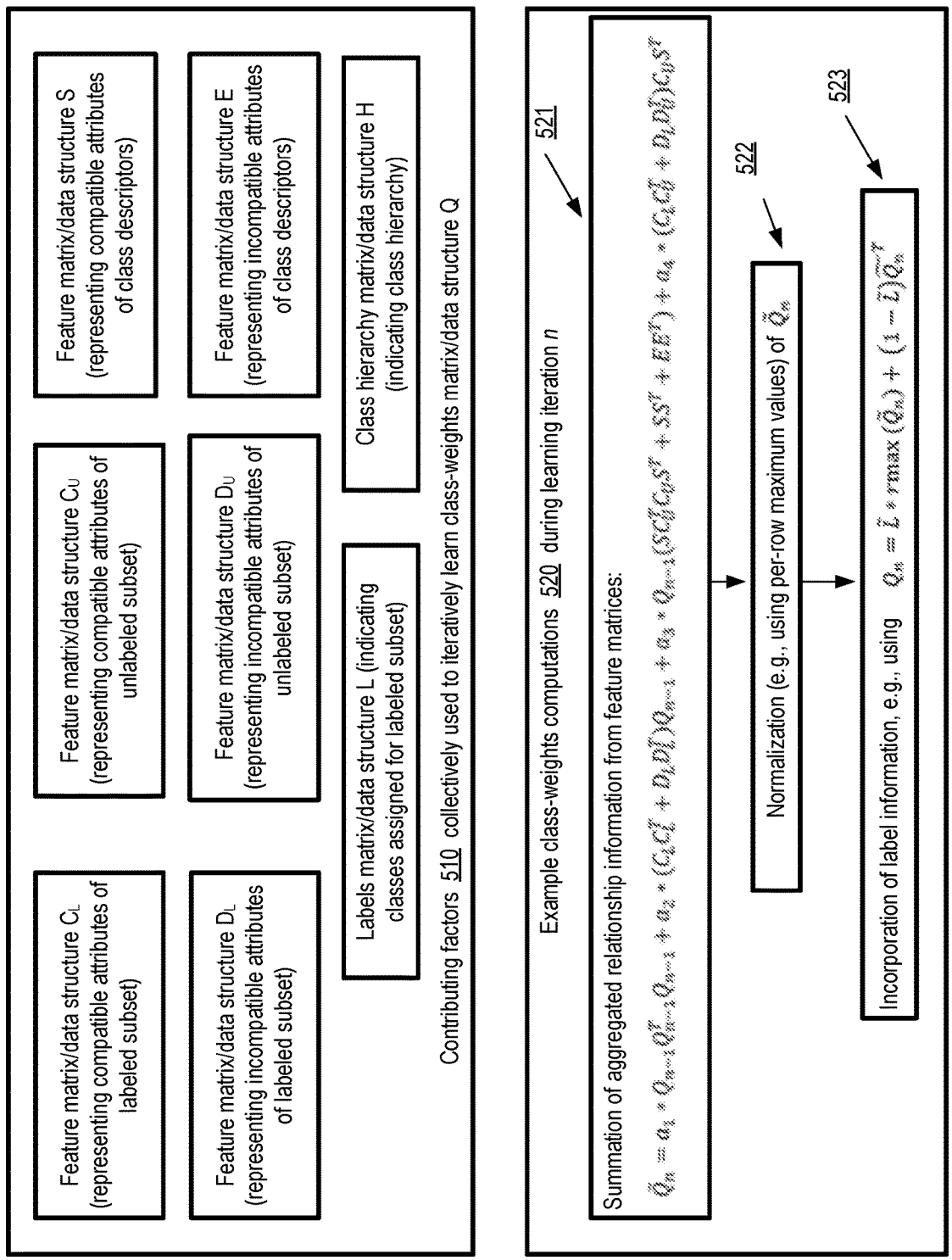
FIG. 5 illustrates example factors that may collectively contribute towards iterative training of a class-weights data structure, and examples of the types of computations that may be performed during a given training iteration, according to at least some embodiments.

FIG. 5 illustrates example factors that may collectively contribute towards training of a class-weights data structure, and examples of the types of computations that may be performed during a given training iteration, according to at least some embodiments. In the depicted embodiment, factors 510 that contribute towards the iterative learning of such a class-weights matric or data structure Q may include the contents of the various feature matrices/data structures introduced above, such as $C_L$, $C_U$, S, $D_L$, $D_U$ and/or E. Individual ones of these matrices or data structures may represent encoded characteristics of different aspects of the data items and the class descriptors, and may therefore be combined together in various ways in different embodiments to capture relationships among those encodings and to learn the elements of a class-weights matrix Q iteratively. In addition to the feature matrices, a label matrix or data structure L, indicating the particular target classes to which individual ones of the labeled data items are assigned, may also be used in various embodiments. In at least some embodiments, as mentioned earlier, at least a subset of the target classes, represented by the class descriptors from which S and E are extracted, may be arranged in a hierarchy, and an encoding of the hierarchy may be captured in a class hierarchy matrix or data structure H. The hierarchy encoding structure H may be used, for example, to propagate class labels in some embodiments if needed down a class hierarchy. In one embodiment, a modified version L of a label matrix which includes the propagated information may be obtained by aggregating the original L label matrix with H, e.g., using element-wise multiplication. In other embodiments, the target classes may not be hierarchically organized, so L may not have to be modified.

A number of training iterations may be performed to compute Q in various embodiments, until a selected training completion criterion is satisfied—e.g., until the classification results predicted via the latest version of Q are satisfactory, or until resources set aside for training are exhausted. The version of Q generated in the $n^{th}$ iteration may be referred to as $Q_n$ in the depicted embodiment, and the data structures are all assumed to be matrices. As indicated in example computations block 520, several steps may be involved in a given iteration (such as the illustrated $n^{th}$ iteration) in some embodiments. In one step, such as the illustrated step 521, an intermediate version $\tilde{Q}_n$ of $Q_n$ may be generated using a summation of a number of terms that include matrix multiplication operations involving the previous iteration's class-weights matrix and several of the feature matrices such as $C_L$, $C_U$, S, $D_L$, $D_U$ and E. Note that for the very first iteration (in which $Q_{n-1}$ is not available), in at least some embodiments, $\tilde{Q}_n$ may be initialized to $C_L S^T$. As shown, in some embodiments respective coefficients such as $a_1$, $a_2$, $a_3$ and/or $a_4$ may be assigned to individual ones of the matric product terms, indicating for example the expected relative importance of the terms for the classification problem being addressed. More details regarding the inclusion of individual ones of the terms in formulation 521 are provided below in the context of FIG. 6. After $\tilde{Q}_n$ has been computed, a normalization step 522 may be performed in at least some embodiments—e.g., each of the values in a given row r of $\tilde{Q}_n$ may be divided by the absolute value of the maximum value $r_{max}$ within that row, or some other normalization technique such as L1 norm, L2 norm, L-infinity norm may be employed. Normalization involving division by the row maximums may, for example, result in a reduction of the differences of the weights assigned to data items that belong to the same class. The use of the per-row maximum value for normalization may represent a working solution with relatively low computation costs in some embodiments.

After normalization, label information may be incorporated to obtain the iteration's value of $Q_n$, as indicated in step 523 in at least some embodiments. In the formula shown in step 523 $Q_n = \tilde{L} * rmax(\tilde{Q}_n) + (1-\tilde{L})\widetilde{Q_n}^T$, $\tilde{Q}_n$ is a matrix, and $rmax(\tilde{Q}_n)$ is a vector that is composed of the maximum value of each row in $\tilde{Q}_n$. The depicted formula is a generic expression for normalization using label information, corresponding, for example, to the use of L1 norm, L-infinity norm or L2 norm. In embodiments in which the formula shown in element 523 of FIG. 5 is used, each element of each row of L is multiplied by the rmax value, thus replacing the value in the label column with rmax. Generally speaking, the incorporation of label information (and the normalization of $\tilde{Q}_n$) may be performed using any of several approaches in different embodiments. In at least some embodiments in which normalization using row-level maximums is performed, $rmax(\tilde{Q}_n)$ is 1, and so the more generic formula $Q_n = \tilde{L} * r\,max(\tilde{Q}_n) + (1-\tilde{L})\widetilde{Q_n}^T$ shown in step 523 simplifies to $Q_n = \tilde{L} + (1-\tilde{L})\widetilde{Q_n}^T$. In the label incorporation step, in at least some embodiments in which matrices are used, multiplication operations may be performed at the element level instead of using matrix multiplication. A simple toy example that illustrates the kinds of computations shown in FIG. 5 is provided below. Note that variants of the equation shown in step 521 may be employed in some embodiments—e.g., the $EE^T$ term may not be included in some embodiments. In at least one embodiment in which matrices are used as the feature data structures, one or more of the feature matrices may have to be transformed (e.g., padded with zeros) to ensure that matrix multiplications of the kind shown in FIG. 5 are permitted.

Figure 6:
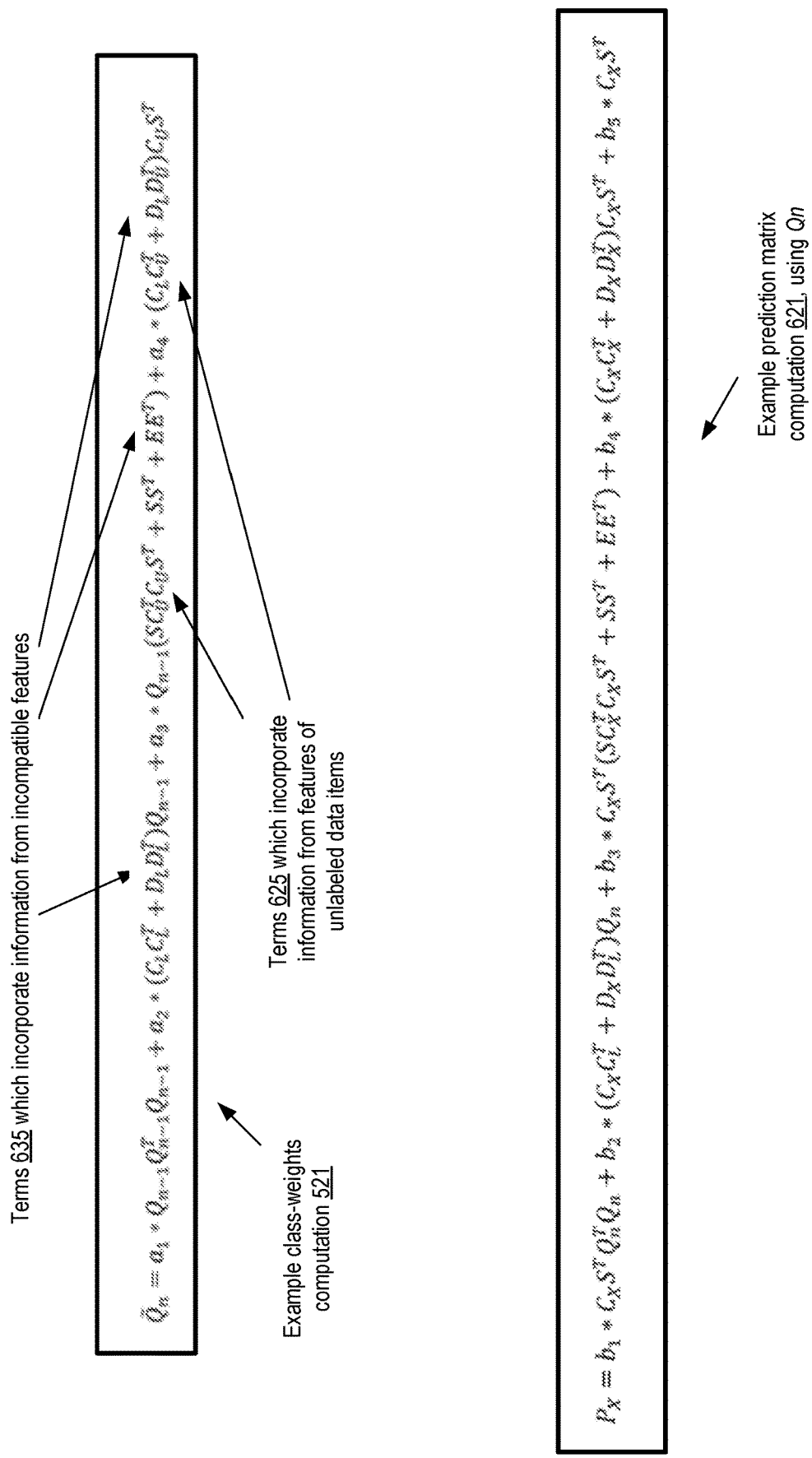
FIG. 6 illustrates example formulas that may be employed during the training of a class-weights matrix, and to generate class predictions using the class-weights matrix, according to at least some embodiments.

FIG. 6 illustrates example formulas that may be employed during the training of a class-weights matrix, and to generate class predictions using the class-weights matrix, according to at least some embodiments. In the example class-weights computation 521, the terms 625 involving $C_U$ and $D_U$ may help to incorporate information from features of the unlabeled data items into the learned class weight values. Terms 635 that involve $D_L$, $D_U$ and E may similarly help to include information from incompatible attributes of the data items and the class descriptors. The use of terms similar to terms 625 in various embodiments may be based on the intuition that in at least some cases, the labeled subset of data items may not necessarily be sufficient to capture all the relevant characteristics of the larger group of data items that can be useful for classification, and that if only the labeled data is used, the model may not generalize as well as if information from the unlabeled data is also included. The use of terms 635 (or similar terms that represent incompatible attributes) may be based on the intuition that in at least some cases, information contained in the attributes of the data items and/or the class descriptors that cannot be mapped to the same representation space may also be helpful in finding relationships that can be employed for classification. As shown, several terms involving $Q_{n-1}$ may also be used in the iterative computation to propagate the learning from the previous iteration in the depicted embodiment.

One of the benefits of using the approach illustrated in FIG. 6 is that, in each iteration, the relative impact of each of the individual feature matrices on the new value of Q can be distinguished easily, and this may provide insights into the contributions of various parts of the data set towards the class weights. For example, if terms that include $C_U$ or $D_U$ cause a large change in Q, this may indicate that the unlabeled data is contributing to a substantial extent to the weights, which may in turn indicate that the labeled subset may not be representative enough of the data set as a whole. In some embodiments, based at least in part on a computation of an impact of a particular matrix product (or similar aggregate feature data structure) on a change to the class weights in a particular training iteration, it may be determined that the labeled subset of data items does not meet a coverage criterion, and operations to increase the number of labeled data items (e.g., by acquiring additional labels from label providers via labeling sessions such as those discussed in the context of FIG. 1) may be initiated.

After the training is concluded, prediction matrix $P_X$ may be generated, e.g., using computations similar to computation 621, for any desired number of unlabeled data items at a time in various embodiments. The number of rows in $P_X$ may be based at least in part on the number of data items for which predictions are to be generated, and the number of columns may be based at least in part on the number of target classes in some embodiments. As such, the subscript X in computation 621 refers to the set of unlabeled data items for which predictions are to be obtained. Just as the feature matrices $C_U$ and $D_U$ were generated from the unlabeled data items in computations 521, analogous matrices $C_X$ (for compatible attributes of the new data items) and $D_X$ (for incompatible attributes) may be obtained from the new data items for which predictions are to be produced using computations 621 in the depicted embodiment. Individual rows in $C_X$ and $D_X$ may represent feature vectors of the data items to be classified; as such, in the formulation in element 621 of FIG. 6, classes for new data items may be generated using a combination of the learned class-weights matrix $Q_n$, feature vectors corresponding to the new data items, as well as features generated earlier from the labeled and unlabeled training data subsets in the depicted embodiment. A row-maximum based class prediction may be generated for each data item as discussed below in some embodiments. Note that as shown in FIG. 6, in addition to $Q_n$ itself (the fully-trained version of the class-weights matrix), the prediction matrix $P_X$ may also be computed using the $C_L$, S and E matrices in the depicted embodiment—as such, several of the feature matrices used in the Q computations may be re-used in the post-training prediction stage. Furthermore, in at least one embodiment, coefficients such as $b_1$, $b_2$, $b_3$ and/or $b_4$ may be used for the matrix product terms, indicating relative importance of the different terms that are summed to generate the prediction matrix. In some embodiments, variants of the computations shown in FIG. 6 may be employed—e.g., the E matrix may not be used in at least one embodiment for either $P_X$ or Q computations.

Predicted Class Identification Using Row-Maximum Values

Figure 7:
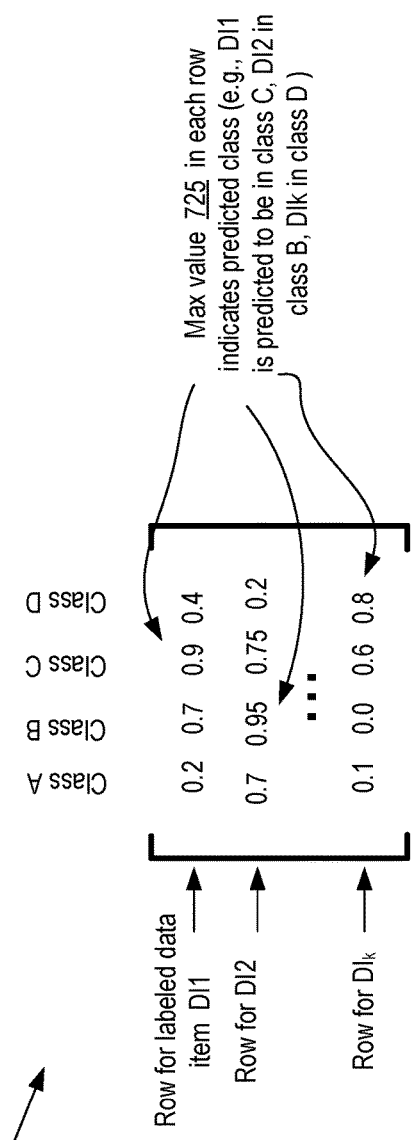
FIG. 7 illustrates a row-maximum based technique for identifying the respective predicted classes of data items, according to at least some embodiments.
Figure 7:
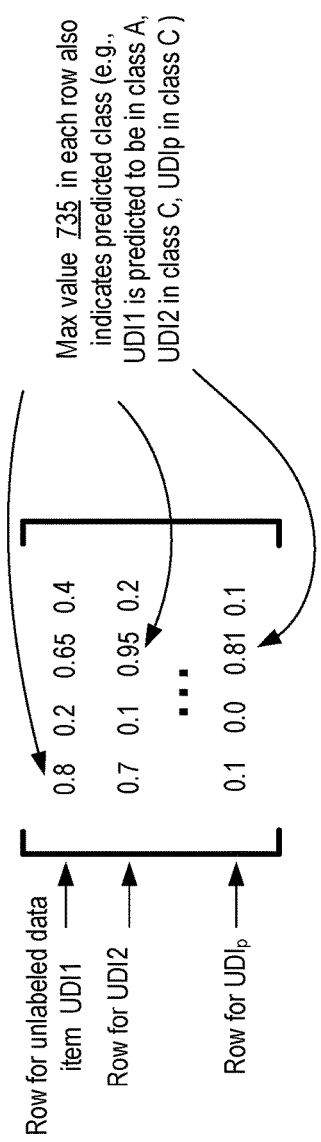

FIG. 7 illustrates a row-maximum based technique for identifying the respective predicted classes of data items, according to at least some embodiments. An example trained Q class-weights matrix 721 is shown, with rows 1 . . . k corresponding to k labeled data items DI1, DI2, . . . , $DI_k$, and with 4 columns corresponding to four target classes (Class A, Class B, Class C and Class D). Each row thus comprises four numerical class-weight values. In at least some embodiments, the maximum 725 among the values of a given row may be identified, and the column in which that maximum value lies may correspond to the class predicted for the data item corresponding to the row. According to this row-maximum based approach for class prediction, item DI1 would be predicted as belonging to Class C in the depicted example, since 0.9 is the maximum value among (0.2, 0.7, 0.9, and 0.4). Similarly, data item DI2 would be predicted to belong to Class B while item $DI_k$ would be predicted to belong to Class D. Note that the labels for all the data items represented in matrix 721 may already be known, so the predicted classes may be compared to the labels to determine how accurate the predictions are—such a comparison may be used to determine when to stop scheduling additional training iterations in various embodiments.

A similar row-maximum based technique may be used to identify predicted classes using a computation for a prediction matrix $P_X$ 731 in various embodiments. The number of rows in $P_X$ is equal to the number of data items (P) for which labels are to be predicted, and the number of columns is equal to the number of classes. Each unlabeled data item (UDI) for which a prediction is desired may thus be represented by a respective row in the $P_X$ matrix. As in the case of matrix 721 and its row-maximum values 725, the row-maximum value 735 may be identified for each UDI to determine the class predicted for it in the depicted embodiment. Thus, Class A may be predicted for UDI1, and Class C may be predicted for UDI2 and $UDI_p$ in the example shown. Note that the values or class weights in a given row need not necessarily add up to any particular total (such as 1) in various embodiments—as such, the values may not necessarily represent probabilities of the classes in at least some embodiments.

Toy Example of Class Prediction

To illustrate some of the types of computations that may be implemented to train a classifier of the kind discussed above in an embodiment in which matrices are used to store feature information and Q, a very simple toy example is provided below. In the toy example, we make a number of assumptions to keep the computations straightforward. We assume, for example, that a data set from which a classifier for two target classes (e.g., classes A and B) is to be trained comprises four labeled data items and two unlabeled data items. To simplify the computation further, we also assume that all the features of the data items and the class descriptors are compatible (thus, matrices $D_L$, $D_U$ and E are not required), that the coefficients $a_1$-$a_4$ (as well as $b_1$-$b_4$) intro- duced in equations for Q and the prediction matrix are all set to 1, and that the feature processing algorithms represent the attributes of the data items and the class descriptors as arrays of length 3. We also assume that there is no hold-out test set, so evaluations are not performed at the end of each iteration to determine whether additional iterations are to be initiated; the example is provided simply to illustrate some of the steps involved in the calculations of a class weights-matrix. Assume further that $C_L$, $C_U$, S and L (the label matrix) have the following values:

$$C_L = \begin{pmatrix} 0.5 & 0 & 1 \\ 0 & 0.5 & 0 \\ 1 & 0 & 0.5 \\ 1 & 1 & 0.5 \end{pmatrix}$$

$$C_U = \begin{pmatrix} 0.49 & 0 & 0.99 \\ 0.5 & 0.4 & 1 \\ 0 & 1 & 0.5 \end{pmatrix}$$

$$S = \begin{pmatrix} 1 & 0 & 1 \\ 0 & 0.5 & 0 \end{pmatrix}$$

$$L = \begin{pmatrix} 1 & 0 \\ 0 & 1 \\ 1 & 0 \\ 1 & 0 \end{pmatrix}$$

Because there are four labeled data items and the dimensionality of the feature vectors is three, the dimensionality of $C_L$ is (4×3) in the toy example. Similarly, because there are three unlabeled data items and each data item is mapped to a feature vector of length three, the dimensionality of $C_U$ is (3×3). Because there are two target classes, and each of the two class descriptors is mapped to a feature vector of length 3, the dimensionality of S is (2×3). The label matrix L may be interpreted as follows, assuming that the first column corresponds to class A, and the second column corresponds to class B: each row corresponds to one of the four labeled data items, and a "1" in a column indicates the label assigned to the data item. Thus, because of the "1"s in the first column, the first, third and fourth data items have been labeled as members of class A, and because of the "1" in the second column, the second column has been classified as belonging to class B.

Given the absence of $D_L$, $D_U$ and E, the iterative formula for becomes:

$$\tilde{Q}_n = \tilde{Q}_{n-1} Q_{n-1}^T Q_{n-1} + (C_L C_L^T) Q_{n-1} + Q_{n-1}(SC_U^T C_U S^T + SS^T) + (C_L C_U^T) C_U S^T \quad \text{Simplified formula SF1:}$$

As mentioned earlier, for the first training iteration, the class-weights matrix may be initialized as follows:

Initialization:

$$\tilde{Q}_1 = C_L S^T = \begin{pmatrix} 1.5 & 0 \\ 0 & 0.25 \\ 1.5 & 0 \\ 1.5 & 0.5 \end{pmatrix}$$

Using row-level normalization, we normalize $\tilde{Q}_1$ by dividing elements of each row by the maximum value of the row. Such normalization may, for example, help to avoid very large (or very small) numerical values from dominating the computations in various embodiments.

Normalization (Iteration 1):

$$\tilde{Q_1} = \begin{pmatrix} 1 & 0 \\ 0 & 1 \\ 1 & 0 \\ 1 & 1/3 \end{pmatrix}$$

Next, the label information may be incorporated as follows, using element-wise (not matrix-level) multiplication. Note that the simplified version of the formulation of step 523 shown in FIG. 5 is used in this toy example (rmax($\tilde{Q}_n$) is 1).

Label Information Incorporation (Iteration 1):

$$Q_1 = L + (1-L)\tilde{Q_1}$$

$$= \begin{pmatrix} 1 & 0 \\ 0 & 1 \\ 1 & 0 \\ 1 & 0 \end{pmatrix} + \left[ \begin{pmatrix} 1 & 1 \\ 1 & 1 \\ 1 & 1 \\ 1 & 1 \end{pmatrix} - \begin{pmatrix} 1 & 0 \\ 0 & 1 \\ 1 & 0 \\ 1 & 0 \end{pmatrix} \right] * \begin{pmatrix} 1 & 0 \\ 0 & 1 \\ 1 & 0 \\ 1 & 1/3 \end{pmatrix}$$

$$= \begin{pmatrix} 1 & 0 \\ 0 & 1 \\ 1 & 0 \\ 1 & 0 \end{pmatrix} + \begin{pmatrix} 0 & 1 \\ 1 & 0 \\ 0 & 1 \\ 0 & 1 \end{pmatrix} * \begin{pmatrix} 1 & 0 \\ 0 & 1 \\ 1 & 0 \\ 1 & 1/3 \end{pmatrix}$$

$$= \begin{pmatrix} 1 & 0 \\ 0 & 1 \\ 1 & 0 \\ 1 & 0 \end{pmatrix} + \begin{pmatrix} 0 & 0 \\ 0 & 0 \\ 0 & 0 \\ 0 & 1/3 \end{pmatrix}$$

$$= \begin{pmatrix} 1 & 0 \\ 0 & 1 \\ 1 & 0 \\ 1 & 1/3 \end{pmatrix}$$

At this stage, to check whether additional iterations are needed, the values of $Q_1$ may typically be used to determine predicted classes for a hold-out test set (e.g., using a prediction computation similar to that shown in equation 621 of FIG. 6). However, in this toy example, as mentioned earlier, no hold-out test set was retained. For the purposes of the example, we assume that at least one more training iteration is to be performed as per the simplified formula SF1.

$$\tilde{Q}_2 = \tilde{Q}_1 Q_1^T Q_1 + (C_L C_L^T) Q_1 + Q_1 (S C_U^T C_U S^T + S S^T) + (C_L C_U^T) C_U S^T$$

After the requisite matrix multiplications are performed, the four terms being summed have the following values:

$$Q_1 Q_1^T Q_1 = \begin{pmatrix} 3 & 0.33 \\ 0.33 & 1.11 \\ 3 & 0.33 \\ 3.11 & 0.70 \end{pmatrix}$$

$$(C_L C_L^T) Q_1 = \begin{pmatrix} 3.25 & 0.33 \\ 0.5 & 0.42 \\ 3.5 & 0.42 \\ 4.5 & 1.25 \end{pmatrix}$$

$$Q_1 (S C_U^T C_U S^T + S S^T) = \begin{pmatrix} 6.69 & 0.55 \\ 0.55 & 0.54 \\ 6.69 & 0.55 \\ 6.87 & 0.73 \end{pmatrix}$$

$$(C_L C_U^T) C_U S^T = \begin{pmatrix} 3.95 & 0.5 \\ 0.55 & 0.29 \\ 3.08 & 0.33 \\ 4.18 & 0.91 \end{pmatrix}$$

The relative individual contributions of each of the terms (including terms involving unlabeled data features) is easy to discover, thus providing an insight into which of the feature sets are most significant from iteration to iteration. The result of the summation is:

$$\tilde{Q}_2 = \begin{pmatrix} 16.89 & 1.72 \\ 1.93 & 2.36 \\ 16.27 & 1.63 \\ 18.67 & 3.59 \end{pmatrix}$$

When row-level normalization is applied (e.g., by dividing the values in each row by the maximum value of that row), we get Normalization (Iteration 2):

$$\tilde{Q_2} = \begin{pmatrix} 1.0 & 0.1 \\ 0.82 & 1.0 \\ 1.0 & 0.1 \\ 1.0 & 0.19 \end{pmatrix}$$

Note that in the row-based normalization technique illustrated here, the quantity (the per-row maximum) by which the entries are divided differs from one row to another. Incorporating the label information using element-wise calculations, we get Label Information Incorporation (Iteration 2):

$$Q_2 = L + (1-L)\tilde{Q_2} = \begin{pmatrix} 1.0 & 0.1 \\ 0.82 & 1.0 \\ 1.0 & 0.1 \\ 1.0 & 0.19 \end{pmatrix}$$

Once again, a test set may be used to determine (e.g., using a prediction computation similar to that shown in equation 621 of FIG. 6) whether the quality of the predictions generate using Q2 is meets target quality criteria, and further iterations may be performed as needed.

In the toy example, we assume that $Q_2$ meets the prediction quality criteria, and that we can therefore stop further training. Using Q2, and setting all the coefficients $b_1$ through $b_4$ shown in formula 621 of FIG. 1 to 1, we may generate the predictions for the unlabeled data whose features are represented by $C_U$ in the toy example, as follows (note that the subscript U is used instead of X in the prediction formulation as we are dealing with the unlabeled data that was already identified in training using the subscript U):

Unlabeled Data Compatible Features:

$$C_U = \begin{pmatrix} 0.49 & 0 & 0.99 \\ 0.5 & 0.4 & 1 \\ 0 & 1 & 0.5 \end{pmatrix}$$

Simplified Prediction Computation for Unlabeled Data:

$$P_U = C_U S^T Q_2^T Q_2 + (C_U C_L^T) Q_2 + C_U S^T (S C_U^T C_U S^T + S S^T) + (C_U C_U^T) C_U S^T + C_U S^T$$

After the matrix multiplications are performed, the terms to be summed are as follows:

$$C_U S^T Q_2^T Q_2 = \begin{pmatrix} 5.4 & 1.80 \\ 5.75 & 2.03 \\ 2.44 & 1.14 \end{pmatrix}$$

$$(C_U C_L^T) Q_2 = \begin{pmatrix} 3.21 & 0.41 \\ 3.81 & 0.70 \\ 2.41 & 0.82 \end{pmatrix}$$

$$C_U S^T (S C_U^T C_U S^T + S S^T) = \begin{pmatrix} 9.90 & 0.81 \\ 10.15 & 0.93 \\ 3.62 & 0.55 \end{pmatrix}$$

$$(C_U C_U^T) C_U S^T = \begin{pmatrix} 3.91 & 0.49 \\ 4.39 & 0.73 \\ 2.71 & 0.81 \end{pmatrix}$$

$$C_U S^T = \begin{pmatrix} 1.48 & 0 \\ 1.5 & 0.2 \\ 0.5 & 0.5 \end{pmatrix}$$

The un-normalized result of the summation of these terms is:

$$P_U = \begin{pmatrix} 23.92 & 3.52 \\ 25.60 & 4.59 \\ 11.68 & 3.80 \end{pmatrix}$$

Using the row-maximum based normalization technique, the normalized version is:

$$P_U^* = \begin{pmatrix} 1 & 0.15 \\ 1 & 0.18 \\ 1 & 0.33 \end{pmatrix}$$

This indicates that the predicted classes (based on the maximum value in each row) for all three unlabeled data items is class A. Note that the feature vector values of the first unlabeled data item (the first row in $C_U$: (0.49, 0, 0.99)) are very similar to the feature vector values of the first labeled data item $C_L$: (0.5, 0, 1.0), and that, as one may expect, the predicted class for the first unlabeled data item also matches the label of the first labeled data item. Similarly, if a prediction is generated using a previously-unseen data item with features $C_X$=(0, 0.95, 0), the normalized prediction result is (0.84, 1), indicating that Class B is predicted for the new data item.

At least in some embodiments, the input data set used for training a CULFA model may be dynamically extended as new labeled data items become available. For example, if the label for a new data item $C_X$=(0, 0.95, 0) were available, a label row for the new item may be added to the label matrix, and a new row may be added to the class-weights matrix, using the values of the prediction result matrix for the new item. The expanded versions of the class-weights matrix and the label matrix may be used for further training iterations as needed in such embodiments. At least in one embodiment, a different row-based normalization technique may be employed, in which a row normalization value other than the maximum value of the row may be computed, and the values of the row may then be transformed using the row normalization value.

Example Programmatic Interactions

Figure 8:
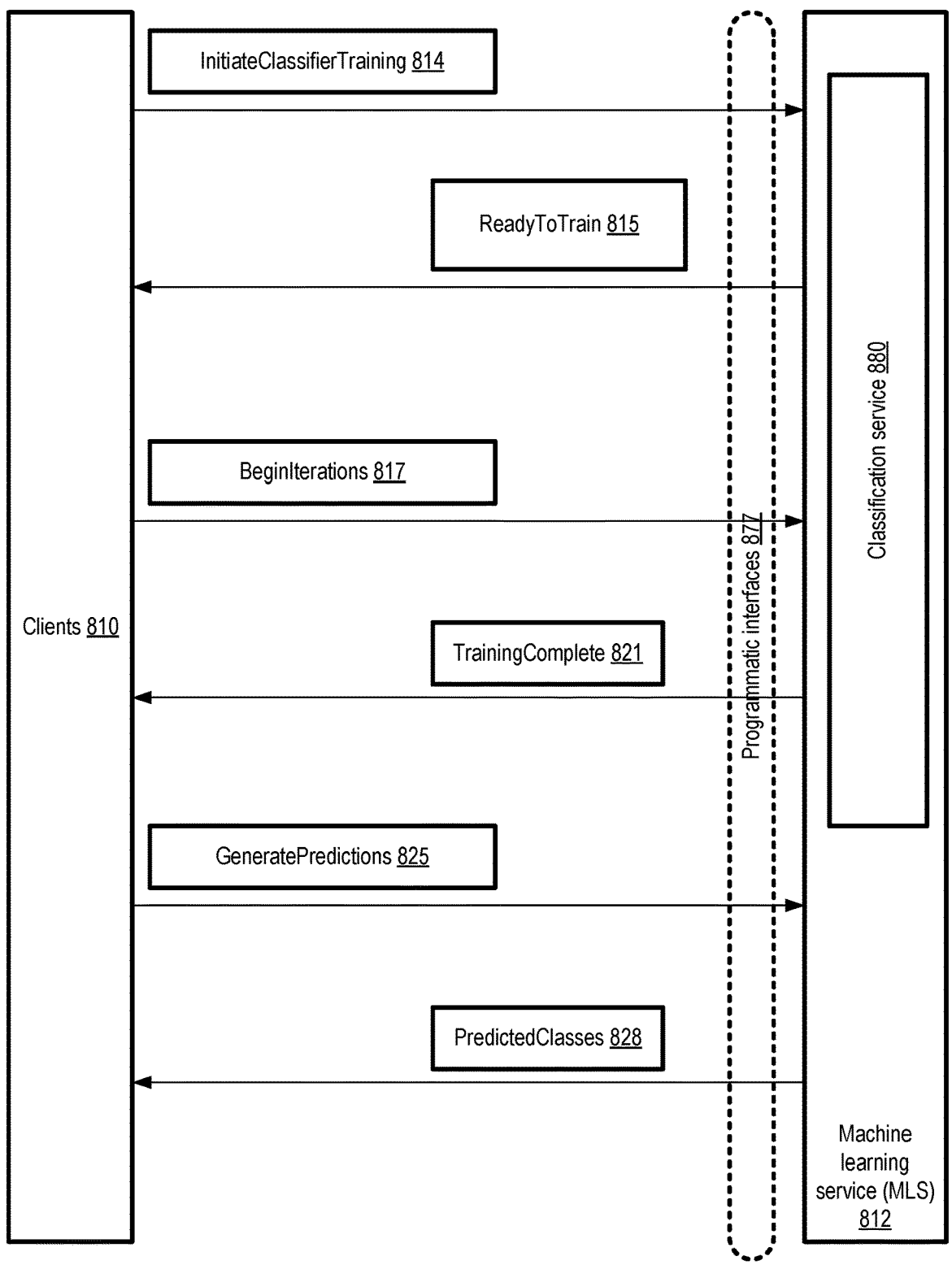
FIG. 8 illustrates example programmatic interactions between a client and a classification service, according to at least some embodiments.

As mentioned earlier, in various embodiments, the classification service (or classification tool) being used may provide one or more programmatic interfaces that can be used by clients to submit requests regarding the training and execution of a classifier. FIG. 8 illustrates example programmatic interactions between a client and a classification service, according to at least some embodiments. In the depicted embodiment, a classification service 880 (similar in functionality to the classification service shown in FIG. 1) may be implemented as part of a broader machine learning service (MLS) 812. Programmatic interfaces 877 exposed by the MLS or the classification service may comprise, for example, one or more web-based consoles or web sites, a set of application programming interfaces, a graphical user interface, and/or command line tools in various embodiments.

A client 810 of the classification service may, for example, submit a request 814 to initiate classifier training. The InitiateClassifierTraining request 814 may comprise various parameters indicating details such as the data sources to be used, the training completion criteria, and so on, as discussed below in the context of FIG. 9. In response, the classification service may identify the set of training resources (e.g., including parallel computing resources on which matrix multiplication operations can be run), ensure that the input data sets (including the class descriptors) can be accessed, and so on, and transmit a ReadyToTrain message 815 to the client 810. In at least some embodiments, there may be a non-trivial delay as the resources needed for the training are identified, so the ReadyToTrain message may be sent via an asynchronous mechanism such as an e-mail, a notification service, or the like.

The client 810 may submit a BeginIterations request 817 to start the training iterations in the depicted embodiment. One or more training iterations of the kind discussed above may be performed, in which respective feature combinations derived from compatible and incompatible attributes of the labeled and unlabeled data items (as well as the class descriptors) may be used to compute a class-weights matrix. After the training completion criteria are satisfied, a trained version of the classifier may be stored, and a TrainingComplete message 821 may be sent to the client in the depicted embodiment.

The client may issue a GeneratePredictions message 825 in various embodiments after the training is complete, indicating one or more unlabeled data items for which a class prediction is desired. The prediction computations, using the class-weights matrix obtained during training, as well as feature sets extracted from the new unlabeled data items, may be performed at the classification service, and the predicted classes 828 may be provided to the client via interfaces 877 in the depicted embodiment. Note that in at least one embodiment, after the final class-weights matrix is obtained, it may be used to generate class predictions for some or all of the unlabeled data items whose features were used during the training. In some embodiments, programmatic interactions other than those shown in FIG. 8 may be implemented.

Example Classifier Training Request Elements

Figure 9:
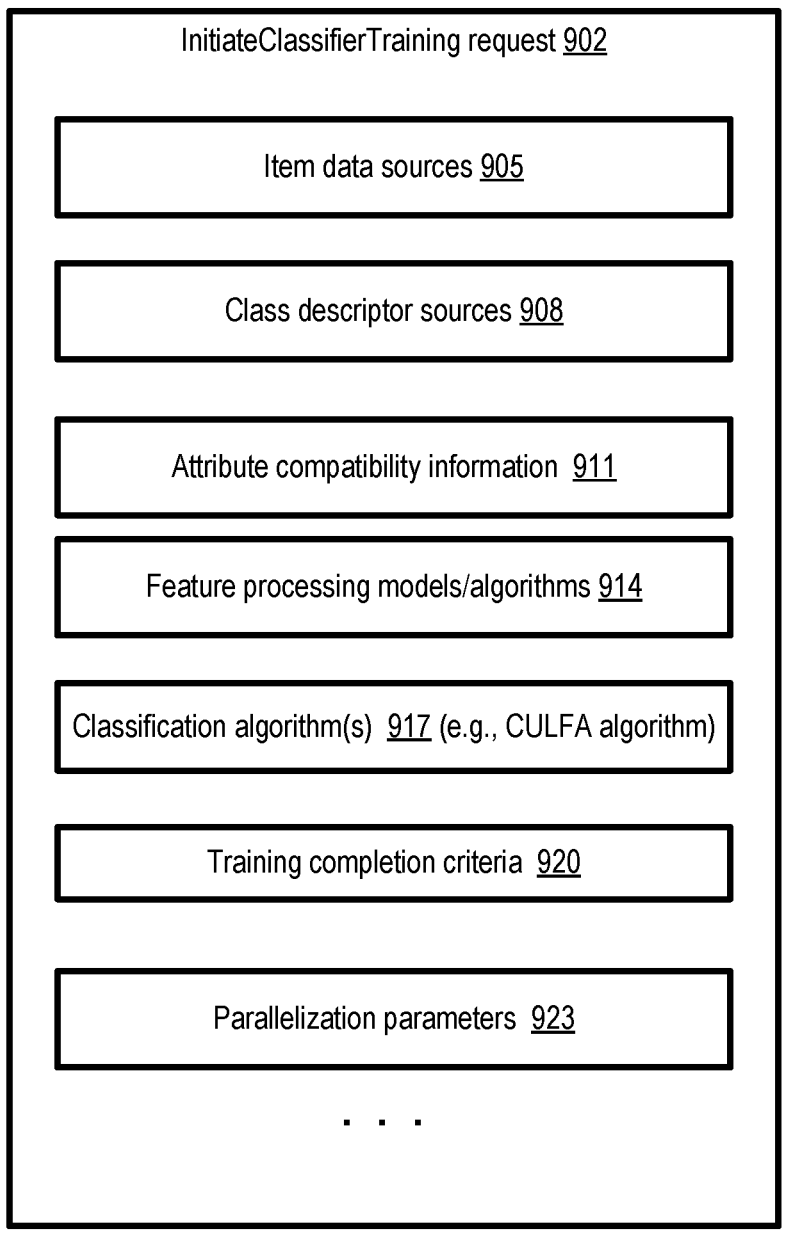
FIG. 9 illustrates an example of classifier training request which may be submitted to a classification service, according to at least some embodiments.

FIG. 9 illustrates an example of classifier training request which may be submitted to a classification service, according to at least some embodiments. In the depicted embodiment, an InitiateClassifierTraining request 902 may, for example, include respective parameters indicating one or more item data sources 905, class descriptor sources 908, attribute compatibility information 911, feature processing models/algorithms 914 to be used, classification algorithms 917 to be employed (e.g., the CULFA algorithm discussed above), training completion criteria 920, and/or parallelization parameters 923.

Item data sources parameter 905 may indicate, for example, one or more databases from which the data items to be classified can be retrieved, the credentials needed to access the data items, the format in which the data items may be retrieved, how to tell which items are already labeled, and so on in different embodiments. Similarly, class descriptor sources parameter 908 may indicate analogous information regarding the descriptors of target classes for the data items, and so on. In at least some embodiments, information indicating the compatible subset of attributes of data items and class descriptors (e.g., sets of one or more attributes that can be represented meaningfully within a common feature space) may be provided in the request 902, e.g., as part of parameter 911. Those attributes which are not designated as compatible may be assumed to be incompatible in some embodiments. In other embodiments, only the incompatible attributes may be indicated in parameter 911, and the set of compatible attributes may be inferred; or, all the compatibility of all the attributes may be indicated.

The specific feature processing algorithms and models to be used to generate the types of feature data structures or matrices discussed above, such as $C_L$, $C_U$, S, and the like, may be indicated in parameter 914 in the depicted embodiment. In at least one embodiment, request 902 may indicate that feature sets corresponding to a particular attribute or a set of attributes should not be used for classification—that is, that feature processing is not required for some attributes. A wide variety of feature processing techniques and/or algorithms may be suggested in parameter 914 in different embodiments for different combinations of one or more attributes, such as word embedding algorithms, character-level embedding algorithms, TFIDF (term frequency-inverse document frequency) based algorithms, hierarchy encoding algorithms, neural network-based feature generation algorithms for non-text attributes (e.g., algorithms in which feature vectors for an image or video frame are extracted from internal layers of a convolution neural network) and the like. In one embodiments, the desired dimensionality of the feature vectors may be indicated in request 902 for one or more attributes or attribute combinations.

The classification algorithm to be used, such as the combined unlabeled and labeled feature analysis (CULFA) algorithm introduced above, may be indicated in parameter 917 in some embodiments. In at least one embodiment, an ensemble of algorithms to be used may be indicated, including the CULFA algorithm as well as one or more other algorithms.

The conditions to be checked to determine whether additional training iterations are required may be indicated in training completion criteria parameter 920 in some embodiments. Such conditions may, for example, be expressed in terms of thresholds for one or more classification quality metrics (e.g., accuracy, precision, recall, etc.), and/or in terms of resource or time budgets in some embodiments. For example, in one embodiment, training may be terminated if either the accuracy of the model reaches a threshold, or if X CPU-seconds or GPU-seconds of computation has been used up, whichever condition is met first.

In at least one embodiment, the computations used for training and/or prediction may be parallelizable—e.g., calculations pertaining to respective portions of the feature matrices may be performed at respective computing devices, with the results being combined subsequently. Parallelization parameter 923 may be used, for example, to indicate how the computations are to be subdivided among a pool of computing devices, the identities of a pre-selected pool of resources of a parallel computing service that can be used for the training, and so on in different embodiments. It is noted that at least in some embodiments, a classifier training request 902 may comprise elements other than those shown in FIG. 9, and/or one or more of the elements shown in FIG. 9 may not be required.

Example Provider Network Environment

Figure 10:
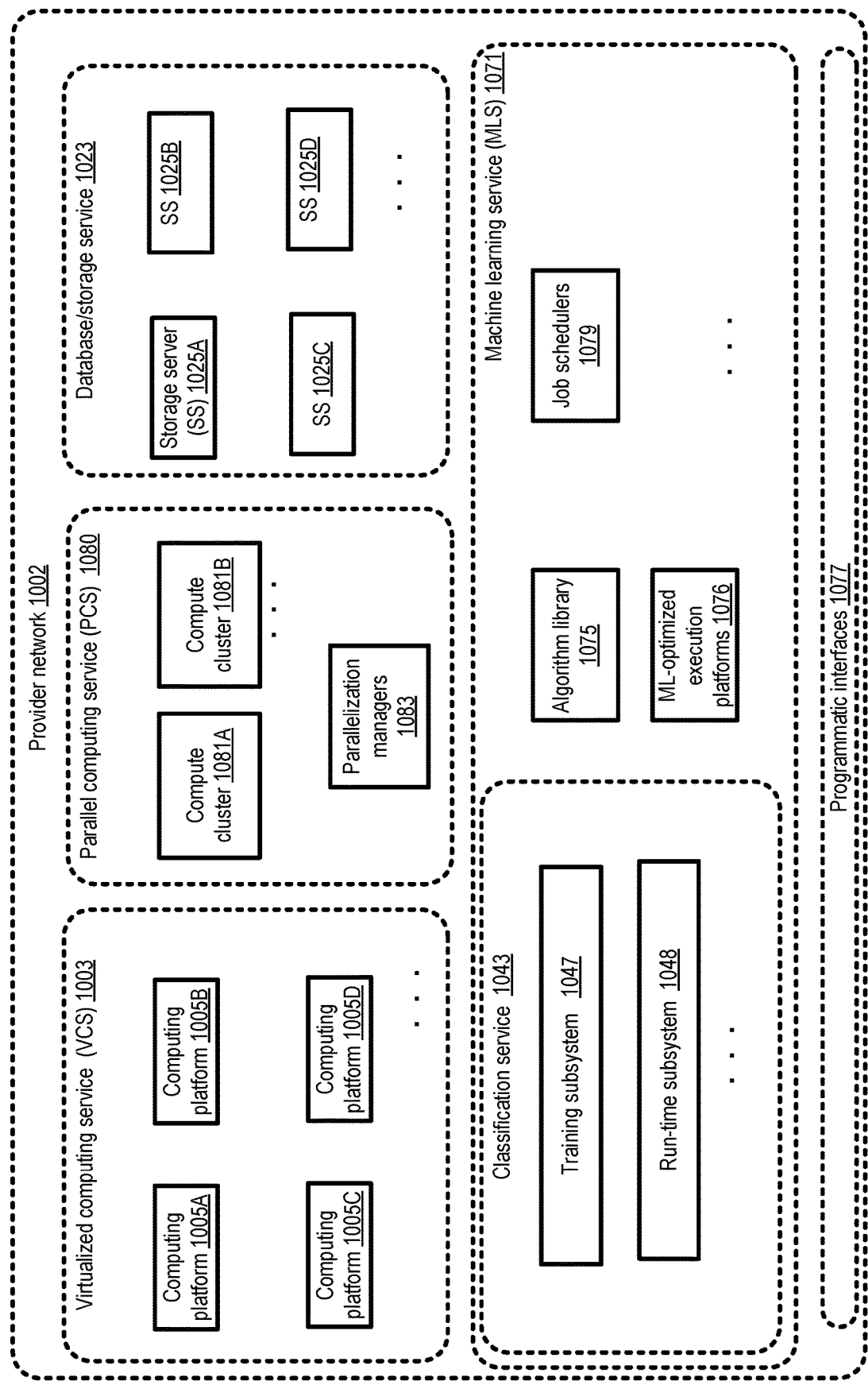
FIG. 10 illustrates a provider network environment in which a classification service may be implemented, according to at least some embodiments.

FIG. 10 illustrates a provider network environment in which a classification service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

The services implemented at provider network 1002 in the depicted embodiment may include, for example, a virtual computing service (VCS) 1003, a database/storage service 1023, a parallel computing service (PCS) 1080, a machine learning service (MLS) 1071 and a classification service 1043. The classification service 1043 may have features and capabilities similar to classification service 102 of FIG. 1 in the depicted embodiment. As shown, in some embodiments, the classification service 1043 may be implemented as a part of the machine learning service 1071; in other embodiments, the classification service 1043 may be implemented as a separate service. Classification service 1043 may comprise a training subsystem 1047 and a run-time subsystem 1048 in the depicted embodiment. Each of the services of provider network 1002 may expose respective sets of programmatic interfaces 1077 to its clients in the depicted embodiment, and some of the services may utilize resources of other services (for example, the classification service 1043, and/or the machine learning service 1071 may utilize virtual machines instantiated at the virtual computing service 1003, compute clusters 1081 of PCS 1080, and/or storage devices provided by the database/storage service 1023). As such, some services of provider network 1002 may act as clients of other services in various embodiments.

At the training subsystem 1047, a combination of feature matrices or other data structures similar to those discussed above may be used to train classification models in the depicted embodiment, and the trained classifiers and feature generation techniques may be used at the run-time subsystem 1048 to generate class predictions for unlabeled data items. Resources from one or more other services may be used, for example, to train the models and/or to execute the trained models. For example, in various embodiments algorithms from algorithm library 1075 of the machine learning service may be executed on behalf of the classification service 1043 using a combination of computing platforms 1005 (e.g., 1005A-1005D) of the VCS 1003 and/or compute clusters 1081 (e.g., 1081A, 1081B etc.) orchestrated by parallelization managers 1083 of PCS 1080, input data and/or intermediate or final results may be stored using storage servers 1025 (e.g., 1025A-1025D) of the database/ storage service, and so on. In some embodiments, intermediate results of matrix computations, corresponding to respective subsets of the feature matrices discussed above, may be computed at some computing nodes of one or more compute clusters 1081, and the intermediate results may be combined at other nodes. Job schedulers 1079 of the machine learning service 1071 may schedule long-running machine learning tasks, such as the training of classification models and/or feature generation models used by the classification service 1043. In some embodiments, special execution platforms 1076 (e.g., platforms comprising graphics processing units (GPUs) or other processors optimized specifically for machine learning) may be available at the MLS 1071, and may be employed for some of the algorithms/models executed by the classification service 1043.

In some embodiments, at least some of the techniques discussed above for training and executing classification models may be implemented without acquiring resources of network-accessible services such as those shown in FIG. 10. For example, a standalone tool implemented at one or more computing devices which are not part of a network-accessible service may be used in some embodiments.

Methods for Classification Using Combinations of Labeled and Unlabeled Data

Figure 11:
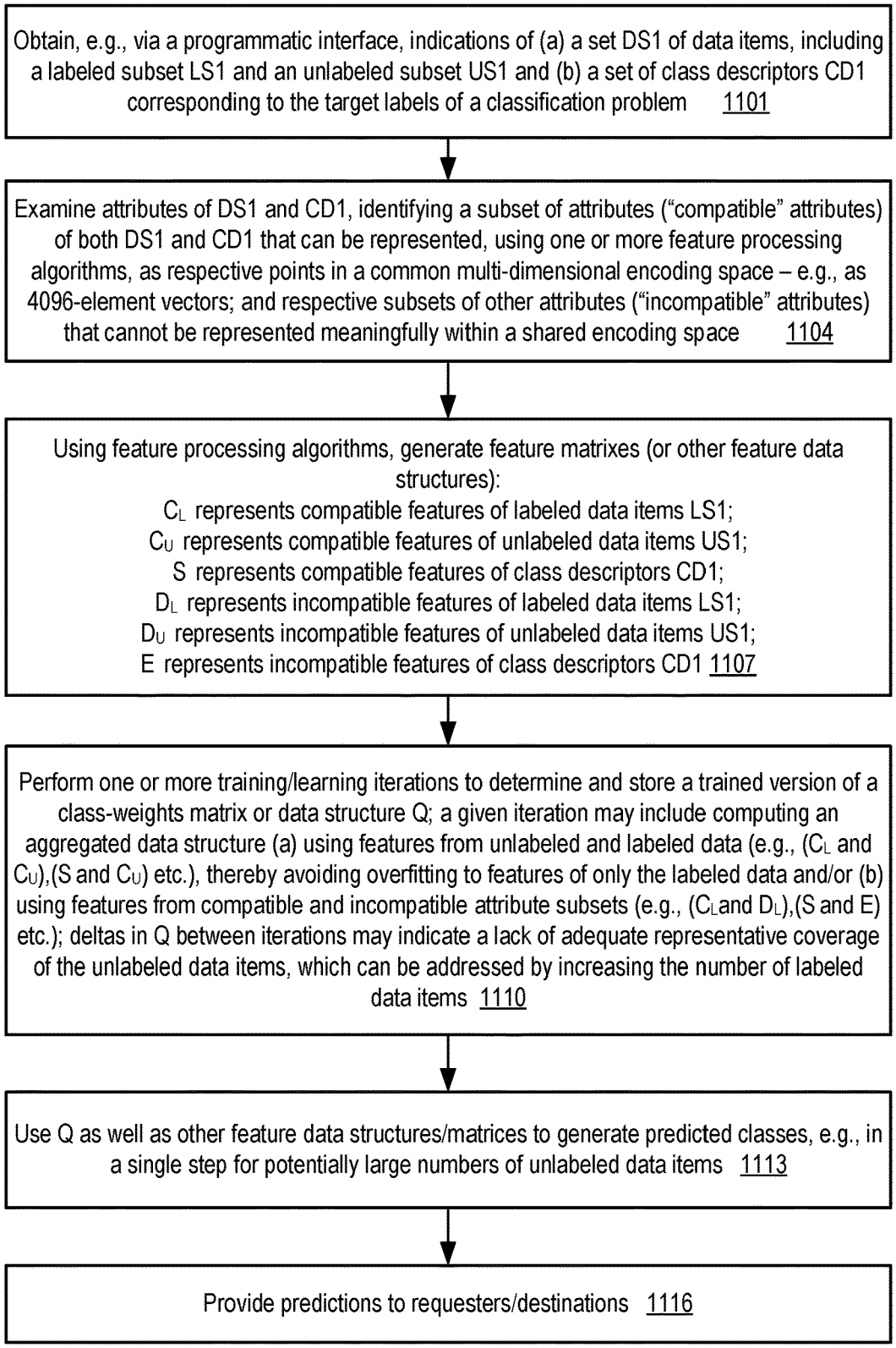
FIG. 11 is a flow diagram illustrating aspects of operations that may be performed to classify data items using feature data structures obtained from unlabeled data items, class descriptors and labeled data items, according to at least some embodiments.

FIG. 11 is a flow diagram illustrating aspects of operations that may be performed to classify data items using feature data structures obtained from unlabeled data items, class descriptors and labeled data items, according to at least some embodiments. As shown in element 1101, an indication of a set DS1 of data items for a classification problem may be obtained in various embodiments; DS1 may comprise a labeled subset LS1 and an unlabeled subset US1. In addition, a set CD1 of class descriptors of the target classes of the classification problem may be obtained. In at least some embodiments, the indications may be obtained as parameters of a programmatic request submitted to a classification service or a machine learning service, e.g., at a provider network of the kind discussed above. In at least one embodiment, a standalone classification tool may be used instead of a service. The data items and the class descriptors may each comprise one or more attributes in various embodiments, such as text attributes, image attributes, video/audio attributes and the like.

Attributes of DS1 and CD1 may in some embodiments be examined or analyzed to identify a subset of attributes ("compatible" attributes) of both DS1 and CD1 that can be represented, using one or more feature processing algorithms, as respective points in a common multi-dimensional encoding space—e.g., as 4096-element vectors (element 1104). In some embodiments, the compatible subsets of attributes of DS1 and/or CD1 may be specified programmatically, or the characteristics (e.g., data types) that are to be used to categorize the attributes as compatible may be specified programmatically to the classification service or tool. Respective subsets of other attributes ("incompatible" attributes) that cannot be represented meaningfully within a shared encoding space may also be identified from DS1 and/or CD1 in various embodiments.

A number of feature matrices (or other feature data structures may be constructed in various embodiments (element 1107), e.g., using any of various feature processing algorithms, to capture salient characteristics of various subsets of the data items and class descriptors. Such matrices/ data structures may include, for example, $C_L$, $C_U$, S, $D_L$, $D_U$, and E in at least some embodiments. $C_L$ may represent compatible features of at least some of the labeled subset of data items LS1. $C_U$ may represent compatible features of at least some of the unlabeled subset of data items LS1. S may represent compatible features of at least some of the class descriptors CD1. $C_L$ may represent incompatible features of at least some of the labeled subset of data items LS1. $D_U$ may represent incompatible features of at least some of the unlabeled subset of data items LS1. E may represent incompatible features of at least some of the class descriptors CD1. A label matrix may also be constructed in various embodiments, in which for example a "1" entry in a particular column of a row for a labeled data item represents the target class of the data item corresponding to the column, while "0" values indicate that the data item is not labeled as belonging to the class represented by the corresponding column. Such a label matrix may be used to compute/ transform the class-weights matrix in various training iterations as discussed below.

One or more training/learning iterations may be performed (element 1110) to determine and store a trained version of a class-weights matrix or data structure Q in the depicted embodiment. A given iteration may, for example, include computing an aggregated data structure (e.g., a product matrix) (a) using features from unlabeled and labeled data (e.g., ($C_L$ and $C_U$), (S and $C_U$) etc.), thereby avoiding overfitting to features of only the labeled data and/or (b) using features from compatible and incompatible attribute subsets (e.g., ($C_L$ and $D_L$), (S and E) etc.). A number of other computations, such as row-based normalization, transformation of the class-weights matrix using the label matrix, and so on may also be performed during a given iteration. The contributions of individual ones of the aggregate data structures towards Q may be easily identified in any given iteration in various embodiments, thus making the impact of different feature sets easier to understand. In various embodiments, analysis of the impact on Q (e.g., between a given pair of successive iterations) of different combinations of the feature matrices may indicate a lack of adequate representative coverage of the unlabeled data items (i.e., that the labeled items do not represent the unlabeled items very well), which may for example be addressed by increasing the number of labeled data items. Parallel execution platforms may be used for the training computations in at least some embodiments—e.g., intermediate aggregation results for portions of the data structures may be obtained at respective computing nodes of a pool or cluster of parallel computing devices, and such results may be combined at other nodes in some cases.

After Q has been trained (e.g., after targeted classification metrics have been attained and/or budgeted training resources have been exhausted), the trained version of Q may be stored and used (along with some of the other feature data structures) to generate predictions for one or more unlabeled or new data items (element 1113) in the depicted embodiment. Predictions may be generated for a large number of unlabeled data items at the same time, e.g., using parallel computing platforms in a similar way to that used during training. The predictions may be provided to requesters and/or other destinations (such as downstream programs or applications that may utilize the predictions to perform additional processing) in various embodiments (element 1116).

It is noted that in various embodiments, some of the operations shown in FIG. 11 may be implemented in a different order than that shown in the figure, or may be performed in parallel rather than sequentially. Additionally, some of the operations shown in FIG. 11 may not be required in one or more implementations.

Use Cases

The techniques described above, of determining class weights used to generate class predictions using combinations of features of labeled as well as unlabeled data items, as well as combinations of semantically and representationally compatible and incompatible attributes, may be extremely useful in a variety of scenarios. For example, some large-scale e-retailers may have inventories comprising tens of millions of items, which may have to be classified based on potentially complicated regulations (e.g., regarding product safety, export/import and the like) of various jurisdictions. By automating the classification process as described, and utilizing parallel processing platforms, it may become possible to classify millions of inventory items orders of magnitude quicker than if alternative techniques were implemented. Problems such as overfitting, which are hard to overcome in some conventional classification algorithms, may be avoided as a result of the use of features of the unlabeled data. Furthermore, because the relative contributions of subsets of attributes to the weights may be easy to detect in the described techniques, insights into the inner working of the classification techniques may be provided, which may in turn help to debug the technique, to make adjustments such as improving the coverage of the data items in the labeled subset of data items, and so on.

Illustrative Computer System

Figure 12:
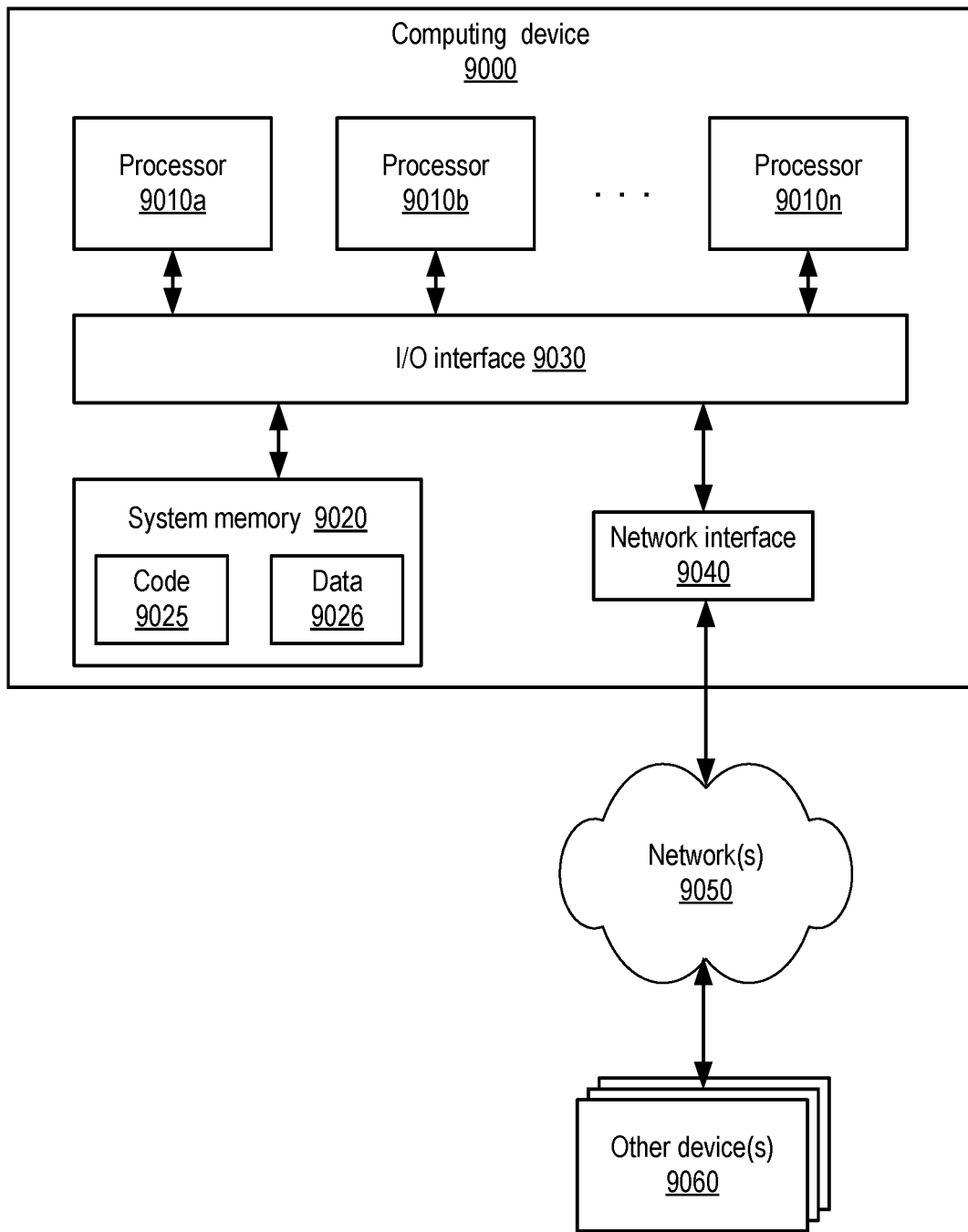
FIG. 12 is a block diagram illustrating an example computing device that may be used in at least some embodiments.

In at least some embodiments, a server that implements a portion or all of one or more of the technologies described herein, including the techniques to train and execute a classification model using the described combination of feature information, as well as various components of a machine learning service may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of an artificial intelligence service;
   wherein the one or more computing devices are configured to:
      obtain a first set of data items, comprising a labeled subset and an unlabeled subset, wherein the labeled subset comprises one or more labeled data items, wherein the unlabeled subset comprises one or more unlabeled data items, wherein one or more labels of the labeled data items correspond to respective class names of a plurality of target classes;
      obtain a set of class descriptors corresponding to individual target classes of the plurality of target classes, wherein the set of class descriptors includes one or more attributes associated with the plurality of target classes;
      identify at least a first collection of one or more attributes of the labeled and unlabeled data items of the first set of data items that can be represented, using a first feature processing algorithm, as respective points in a first multi-dimensional encoding space, wherein at least a second collection of the one or more attributes of the class descriptors can also be represented, using the first feature processing algorithm, as respective points in the first multi-dimensional feature space within which the first collection of one or more attributes the labeled and unlabeled data items of the first set of data items can be represented;
      generate a plurality of feature matrices, including: (a) a first feature matrix comprising representations, within the first multi-dimensional encoding space, of the first collection of attributes of at least some members of the labeled subset; (b) a second feature matrix comprising representations, within the first multi-dimensional encoding space, of the first collection of attributes of at least some members of the unlabeled subset; and (c) a third feature matrix comprising representations, within the first multi-dimensional encoding space, of the second collection of attributes of at least some class descriptors of the plurality of class descriptors;
      determine, in one or more training iterations, a trained version of a class-weights matrix which meets a classification accuracy criterion, wherein at least one dimension of the class-weights matrix is based at least in part on a number of target classes in the plurality of target classes, and wherein at least one training iteration comprises computing (a) an aggregate matrix obtained from the first feature matrix and the second feature matrix and (b) an aggregate matrix obtained from the second feature matrix and the third feature matrix; and
      provide, to one or more destinations, an indication of a predicted target class of a particular data item which is not in the first set, wherein the predicted target class is determined using (a) the trained version of the class-weights matrix and (b) one or more feature vectors computed from the particular data item.

2. The system as recited in claim 1, wherein the first collection of one or more attributes includes at least one of: (a) text attribute, (b) an image attribute, (c) a video attribute or (d) an audio attribute.

3. The system as recited in claim 1, wherein the one or more computing devices are configured to:
   determine that a request to initiate training of a classifier has been received via a programmatic interface, wherein the request indicates one or more of: (a) the first set of data items or (b) at least one class descriptor of the set of class descriptors.

4. The system as recited in claim 1, wherein the plurality of feature matrices includes a fourth feature matrix comprising representations, within a different multi-dimensional encoding space, of another collection of attributes of at least some members of the labeled subset, wherein at least one training iteration comprises computing an aggregate data structure from the fourth feature matrix and another feature matrix of the plurality of feature matrices.

5. The system as recited in claim 1, wherein the plurality of feature matrices includes a fourth feature matrix comprising representations, within a different multi-dimensional encoding space, of another collection of attributes of at least some members of the unlabeled subset, wherein at least one training iteration comprises computing an aggregate data structure from the fourth feature matrix and another feature matrix of the plurality of feature matrices.

6. A method, comprising:
performing, by one or more computing devices:
identifying at least a first collection of one or more attributes of data items of a first set of data items, wherein the first collection of the attributes of the data items can be represented, using a first feature processing algorithm, within a first encoding space within which at least a second collection of one or more attributes of a plurality of class descriptors for a plurality of target classes can also be represented using the first feature processing algorithm, wherein individual ones of the class descriptors correspond to respective classes of the plurality of target classes;
generating a plurality of feature data structures, including: (a) a first feature data structure comprising representations, within the first encoding space, of the first collection of attributes of at least some members of an unlabeled subset of the first set of data items; and (b) a second feature data structure comprising representations, within the first encoding space, of the second collection of attributes of at least some class descriptors of the plurality of class descriptors;
determining, in one or more training iterations, a class-weights data structure which meets a quality criterion, wherein individual portions of the class-weights data structure correspond to individual ones of the target classes, and wherein at least one training iteration comprises computing an aggregate data structure from the first feature data structure and the second feature data structure; and
storing at least one version of the class-weights data structure used to predict respective target classes of one or more data items that are not members of the first set.

7. The method as recited in claim 6, wherein the first collection of attributes includes at least one of: (a) text attribute, (b) an image attribute, (c) a video attribute or (d) an audio attribute.

8. The method as recited in claim 6, wherein the plurality of feature data structures includes a third feature data structure comprising representations, within the first multi-dimensional encoding space, of the first collection of attributes of at least some members of a labeled subset of the first set of data items, and wherein at least one training iteration comprises computing an aggregate data structure from the third feature data structure and the first feature data structure.

9. The method as recited in claim 6, wherein the plurality of feature data structures includes a third feature data structure comprising representations, within a different multi-dimensional encoding space, of another collection of attributes of at least some members of a labeled subset of the first set of data items, wherein at least one training iteration comprises computing an aggregate data structure from the third feature data structure and another feature data structure of the plurality of feature data structures.

10. The method as recited in claim 6, wherein the plurality of feature data structures includes a third feature data structure comprising representations, within a different multi-dimensional encoding space, of another collection of attributes of at least some members of the unlabeled subset of the first set of data items, wherein at least one training iteration comprises computing an aggregate data structure from the third feature data structure and another feature data structure of the plurality of feature data structures.

11. The method as recited in claim 6, wherein the plurality of feature data structures include a third feature data structure comprising representations, within a different multi-dimensional encoding space, of another collection of attributes of at least some class descriptors of the plurality of class descriptors, wherein at least one training iteration comprises computing an aggregate data structure from the third feature data structure and another feature data structure of the plurality of feature data structures.

12. The method as recited in claim 6, further comprising:
determining that a plurality of computing nodes of a parallel computing service of a provider network is to be used to perform at least a portion of a particular training iteration of the one or more training iterations, wherein the plurality of nodes includes a first computing node and a second computing node;
causing, at the first node, a first intermediate result of the particular iteration to be generated using a computation on a first portion of the first feature data structure; and
causing, at the second node, a second intermediate result of the particular iteration to be generated using a computation on a second portion of the first feature data structure.

13. The method as recited in claim 6, further comprising performing, by the one or more computing devices:
determining, based at least in part on a computation of an impact of a particular aggregate feature data structure on a change to a class-weights data structure generated in a particular training iteration, that a labeled subset of the first set does not meet a coverage criterion with respect to the unlabeled subset; and
initiating one or more operations to increase a number of labeled data items of the first set.

14. The method as recited in claim 6, wherein the class-weights data structure comprises a first matrix, and wherein at least one training iteration comprises computing an aggregation of (a) a version of the first matrix obtained in a previous training iteration and (b) a transpose of the version of the first matrix obtained in the previous training iteration.

15. The method as recited in claim 6, wherein the class-weights data structure comprises a class-weights matrix, and wherein at least one training iteration comprises:
identifying, based at least in part on an analysis of elements of a first row of the class-weights matrix, a first row normalization value;
identifying, based at least in part on an analysis of elements of a second row of the class-weights matrix, a second row normalization value which differs from the first row normalization value;
updating the class-weights matrix by (a) dividing individual ones of the elements of the first row by the first row normalization value and (b) dividing individual ones of the elements of the second row by the second row normalization value.

16. The method as recited in claim 6, wherein the class-weights data structure comprises a class-weights matrix, and wherein at least one training iteration comprises:
generating a label matrix, wherein a number of rows of the label matrix is based at least in part on a number of labeled data items in a labeled subset of the first set, and wherein an individual row of the label matrix comprises an indication of a particular target class to which a labeled data item represented by the individual row belongs;

transforming the class-weights matrix using the label matrix; and determining, based at least in part on the transformed version of the class-weights matrix, whether an additional training iteration is to be implemented.

17. A non-transitory computer-accessible storage medium storing program instructions that when executed on one or more processors cause the one or more processors to:

identify at least a first collection of one or more attributes of data items of a first set of data items, wherein the first collection of the one or more attributes of the data items can be represented, using a first feature processing algorithm, within a first encoding space within which at least a second collection of one or more attributes of a plurality of class descriptors for a plurality of target classes can also be represented using the first feature processing algorithm, wherein individual ones of the class descriptors correspond to respective classes of the plurality of target classes;

generate a plurality of feature data structures, including: (a) a first feature data structure comprising representations, within the first encoding space, of the first collection of attributes of at least some members of an unlabeled subset of the first set of data items; and (b) a second feature data structure comprising representations, within the first encoding space, of the first collection of attributes of at least some members of a labeled subset of the first set of data items;

determining, in one or more training iterations, a class-weights data structure which meets a quality criterion, wherein individual portions of the class-weights data structure correspond to individual ones of the target classes, and wherein at least one training iteration comprises computing an aggregate data structure from the first feature data structure and the second feature data structure; and storing at least one version of the class-weights data structure used to predict respective target classes of one or more data items that are not members of the first set.

18. The non-transitory computer-accessible storage medium as recited in claim 17, wherein the first collection of attributes includes at least one of: (a) text attribute, (b) an image attribute, (c) a video attribute or (d) an audio attribute.

19. The non-transitory computer-accessible storage medium as recited in claim 17, wherein the plurality of feature data structures includes a third feature data structure comprising representations, within the first multi-dimensional encoding space, of the second collection of attributes of at least some class descriptors of the set of class descriptors, and wherein at least one training iteration comprises computing an aggregate data structure from the third feature data structure and the first feature data structure.

20. The non-transitory computer-accessible storage medium as recited in claim 17, wherein at least one feature data structure of the plurality of feature data structures is generated using a feature processing algorithm indicated in a programmatic request.

* * * * *